(12) United States Patent
Sutherland et al.

(10) Patent No.: US 7,570,322 B1
(45) Date of Patent: Aug. 4, 2009

(54) OPTIMIZING PERFORMANCE PARAMETERS FOR SWITCHABLE POLYMER DISPERSED LIQUID CRYSTAL OPTICAL ELEMENTS

(75) Inventors: Richard L. Sutherland, Dayton, OH (US); Stephen A. Siwecki, Dayton, OH (US); Vince P. Tondiglia, Dayton, OH (US)

(73) Assignee: Science Applications International Corporation, San Diego, CA (US)

( * ) Notice: Subject to any disclaimer, the term of this patent is extended or adjusted under 35 U.S.C. 154(b) by 287 days.

(21) Appl. No.: 11/591,526

(22) Filed: Nov. 2, 2006

Related U.S. Application Data

(62) Division of application No. 11/399,516, filed on Apr. 7, 2006, which is a division of application No. 11/129,441, filed on May 16, 2005, now Pat. No. 7,072,020, which is a division of application No. 10/408,259, filed on Apr. 8, 2003, now Pat. No. 6,950,173.

(51) Int. Cl.
*G02F 1/1333* (2006.01)
*G02B 5/32* (2006.01)
*G03H 1/04* (2006.01)

(52) U.S. Cl. .................. 349/86; 349/201; 359/15; 430/1; 430/2

(58) Field of Classification Search ............ 349/86, 349/201; 359/15; 430/1, 2
See application file for complete search history.

(56) References Cited

U.S. PATENT DOCUMENTS

| | | | |
|---|---|---|---|
| 3,432,225 A | 3/1969 | Rock | 350/164 |
| 3,565,509 A | 2/1971 | Sulzbach | 350/164 |
| 3,580,655 A | 5/1971 | Leith et al. | 350/3.5 |

(Continued)

FOREIGN PATENT DOCUMENTS

| | | |
|---|---|---|
| CA | 544591 | 8/1957 |

(Continued)

OTHER PUBLICATIONS

Kaiser Optical Systems, Inc., "Holographic Notch Filters," Raman Products Technical Note No. 1050, 2 pp., Copyright 2001.

(Continued)

*Primary Examiner*—Michael H Caley
(74) *Attorney, Agent, or Firm*—King & Spalding LLP

(57) ABSTRACT

Described herein are the materials, mechanisms and procedures for optimizing various performance parameters of HPDLC optical devices in order to meet differing performance requirements. These optimization tailoring techniques include control and independent optimization of switchable HPDLC optical devices to meet the demanding requirements of anticipated applications for, inter alia, the telecommunications and display industries. These techniques include optimization of diffraction efficiency, i.e., index modulation, polarization dependence control, haze, cosmetic quality, control of response and relaxation time, voltage driving for on and off switching, and material uniformity. This control and independent optimization tailors properties of switchable HPDLC optical devices according to the specific requirements of the application of the switchable HPDLC optical device. The invention disclosed herein retains the desirable attributes of the multi-functional acrylate system for forming HPDLC optical devices, but adds new materials to the acrylate system and/or new process control to the recording to optimize performance parameters as may be needed for specific applications. This results in high optical quality switchable holograms with good diffraction efficiency and low, stable switching voltage.

16 Claims, 20 Drawing Sheets

U.S. PATENT DOCUMENTS

| | | | |
|---|---|---|---|
| 3,658,526 A | 4/1972 | Haugh | 96/27 |
| 3,667,946 A | 6/1972 | Sturdevant | 96/35.1 |
| 3,758,186 A | 9/1973 | Brumm | 350/3.5 |
| 4,003,629 A | 1/1977 | Baues et al. | 350/96 C |
| 4,006,963 A | 2/1977 | Baues et al. | 350/96 C |
| 4,018,228 A | 4/1977 | Goosen | 128/305 |
| 4,022,947 A | 5/1977 | Grubb et al. | 428/432 |
| 4,045,124 A | 8/1977 | Pollack et al. | 350/160 LC |
| 4,124,947 A | 11/1978 | Kuhl et al. | 40/453 |
| 4,210,132 A | 7/1980 | Perlin | 128/1 R |
| 4,368,736 A | 1/1983 | Kaster | 128/334 C |
| 4,374,371 A | 2/1983 | Narancic | 337/159 |
| 4,416,540 A | 11/1983 | Nicholson | 350/3.69 |
| 4,477,784 A | 10/1984 | Maerfeld et al. | 333/153 |
| 4,560,249 A | 12/1985 | Nishiwaki et al. | 350/162.17 |
| 4,673,241 A | 6/1987 | Nishiwaki et al. | 350/3.64 |
| 4,688,900 A | 8/1987 | Doane et al. | 350/347 V |
| 4,728,547 A | 3/1988 | Vaz et al. | 428/1 |
| 4,799,746 A | 1/1989 | Wreede | 359/3 |
| 4,809,713 A | 3/1989 | Grayzel | 128/785 |
| 4,810,063 A | 3/1989 | Fergason | 350/347 V |
| 4,818,070 A | 4/1989 | Gunjima et al. | 350/334 |
| 4,832,424 A | 5/1989 | McGrew | 350/3.65 |
| 4,856,876 A | 8/1989 | Fergason | 350/350 F |
| 4,857,425 A | 8/1989 | Phillips | 430/1 |
| 4,891,152 A | 1/1990 | Miller et al. | 252/299.01 |
| 4,923,269 A | 5/1990 | Healey | 350/96.15 |
| 4,929,240 A | 5/1990 | Kirsch et al. | 606/151 |
| 4,930,674 A | 6/1990 | Barak | 227/179 |
| 4,938,568 A | 7/1990 | Margerum et al. | 350/334 |
| 4,942,102 A | 7/1990 | Keys et al. | 430/1 |
| 4,983,176 A | 1/1991 | Cushman et al. | 606/151 |
| 4,994,204 A | 2/1991 | Doane et al. | 252/299.01 |
| 5,003,386 A | 3/1991 | Doyle et al. | 358/90 |
| 5,011,624 A | 4/1991 | Yamagishi et al. | 252/299.5 |
| 5,014,709 A | 5/1991 | Bjelkhagen et al. | 128/654 |
| 5,015,249 A | 5/1991 | Nakao et al. | 606/142 |
| 5,045,572 A | 9/1991 | Plotkin et al. | 522/31 |
| 5,047,040 A | 9/1991 | Simpson et al. | 606/159 |
| 5,084,203 A | 1/1992 | Sansone et al. | 252/299.5 |
| 5,096,282 A | 3/1992 | Margerum et al. | 359/3 |
| 5,105,298 A | 4/1992 | Schellenberg | 359/3 |
| 5,136,666 A | 8/1992 | Anderson et al. | 385/24 |
| 5,144,690 A | 9/1992 | Domash | 385/12 |
| 5,166,813 A | 11/1992 | Metz | 359/15 |
| 5,170,925 A | 12/1992 | Madden et al. | 227/175 |
| 5,174,276 A | 12/1992 | Crockard | 128/4 |
| 5,182,180 A | 1/1993 | Gambogi, Jr. et al. | 430/1 |
| 5,182,665 A | 1/1993 | O'Callaghan et al. | 359/95 |
| 5,188,638 A | 2/1993 | Tzakis | 606/153 |
| 5,198,912 A | 3/1993 | Ingwall et al. | 359/3 |
| 5,210,630 A | 5/1993 | Heynderickx et al. | 359/106 |
| 5,227,859 A | 7/1993 | Leib et al. | 556/347 |
| 5,227,906 A | 7/1993 | Tokumitsu | 359/117 |
| 5,234,447 A | 8/1993 | Kaster et al. | 606/153 |
| 5,235,445 A | 8/1993 | Hirai et al. | 359/52 |
| 5,240,636 A | 8/1993 | Doane et al. | 252/299.01 |
| 5,258,008 A | 11/1993 | Wilk | 606/219 |
| 5,264,950 A | 11/1993 | West et al. | 359/51 |
| 5,270,843 A | 12/1993 | Wang | 359/52 |
| 5,272,550 A | 12/1993 | Dickson et al. | |
| 5,291,317 A | 3/1994 | Newswanger | 359/15 |
| 5,299,289 A | 3/1994 | Omae et al. | 359/95 |
| 5,303,322 A | 4/1994 | Winston et al. | 385/146 |
| 5,313,317 A | 5/1994 | Saburi et al. | 359/13 |
| 5,323,251 A | 6/1994 | Coates et al. | 359/51 |
| 5,328,800 A | 7/1994 | Yokoya et al. | 430/203 |
| 5,330,264 A | 7/1994 | Ando et al. | 359/12 |
| 5,330,486 A | 7/1994 | Wilk | 606/139 |
| 5,332,618 A | 7/1994 | Austin | 428/216 |
| 5,354,498 A | 10/1994 | Akashi et al. | 252/299.01 |
| 5,356,557 A | 10/1994 | Jubb et al. | 252/299.01 |
| 5,363,228 A | 11/1994 | DeJule et al. | 359/117 |
| 5,366,462 A | 11/1994 | Kaster et al. | 505/153 |
| 5,376,095 A | 12/1994 | Ortiz | 505/143 |
| 5,384,067 A | 1/1995 | Doane et al. | 252/299.01 |
| 5,453,338 A | 9/1995 | Suga et al. | 430/1 |
| 5,471,326 A | 11/1995 | Hall et al. | 359/15 |
| 5,488,681 A | 1/1996 | Deacon et al. | 385/37 |
| 5,499,118 A | 3/1996 | Wreede et al. | 359/12 |
| 5,529,861 A | 6/1996 | Redfield | 430/1 |
| 5,544,268 A | 8/1996 | Bischel et al. | 385/4 |
| 5,547,786 A | 8/1996 | Brandstetter et al. | 430/1 |
| 5,593,615 A | 1/1997 | Nerad et al. | 252/299.01 |
| 5,641,426 A | 6/1997 | Nerad et al. | 252/299.01 |
| 5,648,857 A | 7/1997 | Ando et al. | 359/12 |
| 5,661,533 A | 8/1997 | Wu et al. | 349/169 |
| 5,661,577 A | 8/1997 | Jenkins et al. | 359/11 |
| 5,680,233 A | 10/1997 | Faris et al. | 359/41 |
| 5,682,214 A | 10/1997 | Amako et al. | 349/74 |
| 5,695,682 A | 12/1997 | Doane et al. | 252/299.01 |
| 5,698,134 A | 12/1997 | Jubb et al. | 252/299.01 |
| 5,698,343 A | 12/1997 | Sutherland et al. | 430/1 |
| 5,706,375 A | 1/1998 | Mihailov et al. | 385/2 |
| 5,725,970 A | 3/1998 | Martin et al. | 430/2 |
| 5,731,853 A | 3/1998 | Taketomi et al. | 349/15 |
| 5,734,485 A | 3/1998 | Buchkremer et al. | 359/25 |
| 5,748,272 A | 5/1998 | Tanaka et al. | 349/86 |
| 5,751,452 A | 5/1998 | Tanaka et al. | 359/52 |
| 5,771,320 A | 6/1998 | Stone | 385/16 |
| 5,832,148 A | 11/1998 | Yariv | 385/16 |
| 5,852,504 A | 12/1998 | Kato et al. | 359/9 |
| 5,862,214 A | 1/1999 | Aggus et al. | 379/435 |
| 5,875,012 A | 2/1999 | Crawford et al. | 349/74 |
| 5,915,051 A | 6/1999 | Damask et al. | 385/16 |
| 5,930,011 A | 7/1999 | Gambogi, Jr. et al. | 359/15 |
| 5,937,115 A | 8/1999 | Domash | 385/16 |
| 5,942,157 A | 8/1999 | Sutherland et al. | 252/582 |
| 6,115,152 A | 9/2000 | Popovich et al. | 359/15 |
| 6,133,971 A | 10/2000 | Silverstein et al. | 349/86 |
| 6,166,800 A | 12/2000 | Silverstein et al. | 349/201 |
| 6,172,778 B1 | 1/2001 | Reinhorn et al. | 359/15 |
| 6,211,976 B1 | 4/2001 | Popovich et al. | 359/15 |
| 6,271,899 B1 | 8/2001 | Lewis et al. | 349/86 |
| 6,549,256 B1 | 4/2003 | Bryan-Brown et al. | 349/128 |
| 6,567,573 B1 | 5/2003 | Domash et al. | 385/16 |
| 6,618,104 B1 | 9/2003 | Date et al. | 349/86 |
| 6,653,425 B1 | 11/2003 | Armstrong-Poston et al. | 526/289 |
| 6,885,414 B1 | 4/2005 | Li | 349/74 |
| 6,950,173 B1 | 9/2005 | Sutherland et al. | 349/201 |
| 7,072,020 B1 * | 7/2006 | Sutherland et al. | 349/201 |
| 7,077,984 B1 | 7/2006 | Natarajan et al. | 252/582 |
| 7,081,215 B2 | 7/2006 | Natarajan et al. | 252/582 |
| 7,175,780 B1 | 2/2007 | Sutherland et al. | 252/299.01 |
| 7,198,737 B2 | 4/2007 | Natarajan et al. | 252/582 |
| 7,270,769 B2 | 9/2007 | Gandolfo et al. | 252/299.01 |
| 2001/0004279 A1 | 6/2001 | Sako et al. | 349/158 |
| 2001/0010575 A1 | 8/2001 | Yoshida et al. | 349/141 |
| 2001/0019434 A1 | 9/2001 | Popovich et al. | 359/15 |
| 2001/0033400 A1 | 10/2001 | Sutherland et al. | 359/15 |
| 2002/0054251 A1 | 5/2002 | Maruyama et al. | 349/88 |
| 2002/0097355 A1 | 7/2002 | Kralik et al. | 349/86 |
| 2002/0130988 A1 | 9/2002 | Crawford et al. | 349/86 |
| 2003/0007240 A1 | 1/2003 | Blum et al. | 359/319 |
| 2004/0175627 A1 | 9/2004 | Sutherland et al. | 430/1 |

FOREIGN PATENT DOCUMENTS

| | | |
|---|---|---|
| DE | 44 08 746 A1 | 9/1995 |
| EP | 0 087 281 A1 | 8/1983 |
| EP | 0 422 689 A2 | 4/1991 |
| EP | 0 672 386 A1 | 9/1995 |
| EP | 0 856 765 A1 | 8/1998 |

| EP | 0 856 766 A2 | 8/1998 |
| EP | 0 856 768 A2 | 8/1998 |
| EP | 0 867 749 A2 | 9/1998 |
| GB | 2 222 696 | 3/1990 |
| GB | 2 281 566 | 3/1995 |
| GB | 2 292 745 | 3/1996 |
| JP | 60189729 A | 9/1985 |
| JP | 64-68784 A | 3/1989 |
| JP | 3-188479 A | 8/1991 |
| JP | 6-190185 | 4/1994 |
| JP | 10319237 | 12/1998 |
| SU | 1635966 | 3/1991 |
| WO | WO 81/00668 | 3/1981 |
| WO | WO 89/06264 | 7/1989 |
| WO | WO 94/04958 | 3/1994 |
| WO | WO 95/17127 | 6/1995 |
| WO | WO 95/29966 | 11/1995 |
| WO | WO 95/29967 | 11/1995 |
| WO | WO 97/27519 | 7/1997 |
| WO | WO 98/04650 | 2/1998 |
| WO | WO 99/09440 | 2/1999 |
| WO | WO 01/88061 | 11/2001 |

OTHER PUBLICATIONS

De Rosa, Michael E., et al., "Mechanical Deformation of a Liquid Crystal Diffraction Grating in an Elastic Polymer," *Journal of Applied Polymer Science*, vol. 68, pp. 523-526, 1998.
Hoyle, C. E.., et al., "Photopolymerization of a Semifluorinated Difunctional Liquid Crystalline Monomer in a Smectic Phase," *Macromolecules*, 29, pp. 3182-3187, 1996.
Sutherland, Richard L., "Polarization and Switching Properties of Holographic Polymer-Dispersed Liquid-Crystal Gratings. I. Theoretical Model," *J. Opt. Soc. Am. B*, vol. 19, No. 12, pp. 2995-3003, Dec. 2002.
Sutherland, Richard L., et al., "Polarization and Switching Properties of Holographic Polymer-Dispersed Liquid-Crystal Gratings. II. Experimental Investigations," *J. Opt. Soc. Am. B*, vol. 19, No. 12, pp. 3004-3012, Dec. 2002.
Sutherland, Richard L., et al., "Evolution of Anisotropic Reflection Gratings Formed in Holographic Polymer-Dispersed Liquid Crystals," *Applied Physics Letters*, vol. 79, No. 10, pp. 1420-1422, Sep. 3, 2001.
Bowley, Chris C., et al., "Variable-Wavelength Switchable Bragg Gratings Formed in Polymer-Dispersed Liquid Crystals," *Applied Physics Letters*, vol. 79, No. 1, pp. 9-11, Jul. 2, 2001.
"Handbook of Advanced Electronic and Photonic Materials and Devices," *Liquid Crystals, Display, and Laser Materials*, vol. 7, Academic Press, Cover, Copyright Page, Table of Contents (xiii-xvi), pp. 67-103, Copyright 2001.
Cramer, Neil B., et al., "Kinetics of Thiol-Ene and Thiol-Acrylate Photopolymerizations with Real-Time Fourier Transform Infrared," *Journal of Polymer Science: Part A: Polymer Chemistry*, vol. 39, pp. 3311-3319, 2001.
Warren, Garfield T., et al., "P-81: In-Situ Spectroscopy of Holographically Formed Polymer Dispersed Liquid Crystal Materials for High Performance Reflective Display Applications," *SID Digest of Technical Papers*, San Jose, pp. 866-869, 2001.
Sutherland, Richard L., et al., "Switchable Holograms for Displays and Telecommunications," *Proceedings of SPIE*, vol. 4463, pp. 1-10, 2001.
Bowley, C. C., et al., "Improved Reflective Displays Based on Polymer-Dispersed Liquid Crystals," *J. Opt. Technol.*, vol. 67, No. 8, pp. 717-722, Aug. 2000.
Domash, L., et al., "Holographic PDLC for Photonic Applications," *Proceedings of SPIE*, vol. 4107, pp. 46-58, 2000.
Bunning, T. J., et al., "Holographic Polymer-Dispersed Liquid Crystals (H-PDLCs)," *Annu. Rev. Mater. Sci.*, vol. 30, pp. 83-115, 2000.
Cole, Michael C., et al., "Photoinitiatorless Photopolymerizations Involving Monomers That Form Charge Transfer Complexes," *Radtech Technical Proceedings*, Tokyo, Japan, pp. 211-220, Dec. 2000.

R. T. Pogue, et al., "Monomer Functionality Effects in the Anisotropic Phase Separation of Liquid Crystals," *Polymer* 41, pp. 733-741, 2000.
C. C. Bowley, et al., "Advances in Holographic Polymer Dispersed Liquid Crystal Technology," in *Liquid Crystal Materials and Devices*, Mat. Res. Soc. Symposium Proceedings, vol. 559, pp. 97-107, 1999.
M. Date, et al., "Full-Color Reflective Display Device Using Holographically Fabricated Polymer-Dispersed Liquid Crystal (HPDLC)," *Journal of the Society for Information Display (SID)*, vol. 7, pp. 17-22, 1999.
Natarajan, L. V., et al., "Electrically Switchable Reflection Gratings in Polymer Dispersed Liquid Crystals," *Mat. Res. Soc. Symp. Proc.*, vol. 559, pp. 109-116, 1999.
Klosterman, A. M., et al., "Voltage Creep in Holographic PDLC Gratings," *Mat. Res. Soc. Symp. Proc.*, vol. 559, pp. 129-134, 1999.
C. C. Bowley, et al., "45.3: Electro-Optic Investigations of H-PDLCS: The Effect of Monomer Functionality on Display Performance," *SID International Symposium, Digest of Technical Papers*, First Edition, pp. 958-961, May, 1999.
M. Escuti, et al., "5.3: A Model of the Fast-Switching Polymer-Stabilized IPS Configuration," *SID International Symposium, Digest of Technical Papers*, First Edition, pp. 32-35, May 1999.
Seferis, James C., "Refractive Indices of Polymers," *Polymer Handbook*, 4$^{th}$ Edition, John Wiley & Sons, Inc., pp. 571-582, Copyright 1999.
C. C. Bowley, et al., "Morphology of Holographically-Formed Polymer Dispersed Liquid Crystals (H-PDLC)," *Mol. Cryst. Liq. Cryst.*, vol. 331, pp. 209-216, 1999.
J. A. Firehammer, et al., "Lasing Pixels: A New Application for Polymer Dispersed Liquid Crystals (PDLCs)," *Mol. Cryst. Liq. Cryst.*, vol. 331, pp. 165-172, 1999.
Richard L. Sutherland, et al., "Switchable Holograms for Displays and Other Applications," *SPIE Proceedings*, vol. 3421, pp. 8-18, Jun. 1998.
L. V. Natarajan, et al., "Holographic PDLCs for Optical Beam Modulation, Deflection, and Dynamic Filter Applications," *SPIE Proceedings*, vol. 3292, pp. 44-51, Jan. 28-29, 1998.
Montemazzani, G., et al., "Light Diffraction at Mixed Phase and Absorption Gratings in Anisotropic Media for Arbitrary Geometries," *Physical Review E*, vol. 55, No. 1, pp. 1035-1047, Jan. 1997.
K. Thilo Weitzel,et al., "Hologram Recording in DuPont Photopolymer Films by Use of Pulse Exposure," *Optics Letter*, vol. 22, No. 24, Dec. 15, 1997.
L. V. Natarajan, et al., "Electrically Switchable Holograms Containing Novel PDLC Structures," *SPIE Proceedings*, vol. 3143, pp. 182-190, Jul. 28-29, 1997.
N. M. Lawandy, et al., "L1.3: Lasing Pixel PDLC Light Valves for Projection Applications," *SID International Symposium, Digest of Technical Papers*, First Edition, pp. 1001-1004, May 1997.
G. P. Crawford, et al., "Reflective Color LCDs Based on H-PDLC and PSCT Technologies," *Journal of the Society for Information Display*, vol. 5, No. 1, pp. 45-48, 1997.
V. N. Mikhailov, et al., "Pulse Hologram Recording in DuPont's Photopolymer Films," *SPIE*, vol. 3011, pp. 200-202, 1997.
Tondiglia, V. P., et al., "Effects of Varying Surfactants on the Electro-Optical Switching Characteristics of Volume Holograms Recorded in PDLC's," *Mat. Res. Soc. Symp. Proc.*, vol 479, pp. 235-240, 1997.
D. Schwarze-Haller and F. Noack, "Nuclear Magnetic Resonance Field-Cycling Proton Relaxation Study of Polymer Dispersed Liquid Crystals," *J. Chem. Phys.*, vol. 105, No. 11, pp. 4823-4832, Sep. 1996.
G. P. Crawford, et al., "Reflective Color LCDs Based on H-PDLC and PSCT Technologies," *SID International Symposium, Digest of Applications Papers*, pp. 99, May 14-16, 1996.
Lawrence H. Domash, et al., "Switchable-Focus Lenses in Holographic Polymer Dispersed Liquid Crystal," *SPIE*, vol. 2689, pp. 188-194, May, 1996.
Richard L. Sutherland, et al., "The Physics of Photopolymer-Liquid Crystal Composite Holographic Gratings," *SPIE Proceedings*, vol. 2689, pp. 158-169, May 1996.
T. J. Bunning, et al., "Liquid Crystals for Advanced Technologies," *Materials Research Society*, pp. 331-343, Apr. 8-11, 1996.

Timothy J. Bunning, et al., "The Effects of Eliminating the Chain Extender and Varying the Grating Periodicity on the Morphology of Holographically Written Bragg Gratings," *SPIE Proceedings*, vol. 2651, pp. 44-54, Jan. 31-Feb. 1, 1996.

T. J. Bunning, et al., "Morphology of Reflection Holograms Formed in situ Using Polymer-Dispersed Liquid Crystals," *Polymer*, vol. 37, No. 14, pp. 3147-3150, 1996.

G. S. Iannacchione, et al., "Deuterium NMR and Morphology Study of Polymer-Dispersed Liquid-Crystal Bragg Gratings," *Europhysics Letters*, vol. 36, No. 6, pp. 425-430, 1996.

L. V. Natarajan, et al., "Electro-Optical Switching Characteristics of Volume Holograms in Polymer Dispersed Liquid Crystals," *Journal of Nonlinear Optical Physics and Materials*, vol. 5, No. 1, pp. 89-98, Jan. 1996.

R. L. Sutherland, et al., "Switchable Bragg Gratings Formed in situ Within a Polymer-Dispersed Liquid Crystal Composite Medium," *Materials Research Society Symp. Proc.*, vol. 425, pp. 331-341, Apr. 8-11, 1996.

Richard L. Sutherland, et al., "Analysis of Periodic Polymer-Dispersed Liquid Crystal Structures for Dynamic Hologram Applications," *SPIE Proceedings*, vol. 2532, pp. 309-318, Jul. 10-12, 1995.

V. P. Tondiglia, et al., "Volume Holographic Image Storage and Electro-Optical Readout in a Polymer-Dispersed Liquid Crystal Film," *Optics Letters*, vol. 20, No. 11, pp. 1325-1327, Jun. 1, 1995.

Richard L. Sutherland, et al., "Switchable Holograms in New Photopolymer-Liquid Crystal Composite Materials," *SPIE Proceedings*, vol. 2404, pp. 132-143, Feb. 9-10, 1995.

T. J. Bunning, et al., "The Morphology and Performance of Holographic Transmission Gratings Recorded in Polymer Dispersed Liquid Crystals," *Polymer*, vol. 36, No. 14, pp. 2699-2708, 1995.

Drzaic, P. S., "Phase Separation Methods for PDLC Films," in *Liquid Crystal Dispersions, World Scientific*, Singapore, pp. 30-59, 1995.

N. Kawatsuki and H. Ono, "Electro-Optical Properties of Polymer/ (Liquid Crystal) Composite Film Fabricated by Two-Step Phase Separation Method," *Chemistry Letters*, No. 5, pp. 333-334, 1995.

R. L. Sutherland, et al., "Electrically Switchable Volume Gratings in Polymer-Dispersed Liquid Crystals," *Appl. Phys. Lett.*, vol. 64, No. 9, pp. 1074-1076, Feb. 28, 1994.

Richard L. Sutherland, et al., "Development of Photopolymer-Liquid Crystal Composite Materials for Dynamic Hologram Applications," *SPIE Proceedings*, vol. 2152, pp. 303-313, Jan. 26-28, 1994.

K. Tanaka, et al., "Holographically Formed Liquid-Crystal/Polymer Device for Reflective Color Display," *Journal of the Society for Information Display*, vol. 2, No. 1, pp. 37-38, 1994.

L. Domash, et al., "Programmable Beamlet Generator, Dynamic Lens, and Optical Memory Using Electrically Switched Holographic Devices," *SPIE Proceedings*, vol. 2026, pp. 642-652, Nov. 1993.

D. J. Lougnot, et al., "Photopolymers for Holographic Recording: IV. New Self-Processing Formulation Based on β-Hydroxy Ethyloxazolidone Acrylate," *Pure Appl. Opt.*, vol. 2, pp. 383-392, 1993.

R. L. Sutherland, et al., "Bragg Gratings in an Acrylate Polymer Consisting of Periodic Polymer-Dispersed Liquid Crystal Planes," *Chem. Mater.*, vol. 5, No. 10, pp. 1533-1538, 1993.

Jacobine, A. F., "Thiol-Ene Photopolymers (Chapter 7)," in *Radiation Curing in Polymer Science and Technology—vol. III, Polymerization Mechanisms*, Elsevier Applied Science, Cover Page, Copyright Page, Table of Contents (v-vi), pp. 219-268, Copyright 1993.

H. I. Bjelkhagen, et al., "High-Resolution Contact Denisyuk Holography," *Applied Optics*, vol. 31, No. 8, pp. 1041-1047, Mar. 10, 1992.

Hideya Murai, et al., "Electro-Optic Properties for Liquid Crystal Phase Gratings," *SPIE Proceedings*, vol. 1665, pp. 230-239, Feb. 11-13, 1992.

Lawrence H. Domash, "Applications of Dynamic Holograms for Quasi-Volume Storage," *SPIE Proceedings, Very Large Optical Memories-Materials and System Architectures*, vol. 1772, 5 pp., 1992.

Luck, Russell M., et al., "Shrinkage in Conventional Monomers During Polymerization (Chapter 1)," in *Expanding Monomers: Synthesis, Characterization, and Applications*, CRC Press, Inc., Cover Page, Copyright Page, Table of Contents (1 p.), 1-61, 1992.

Richard T. Ingwall and Timothy Adams, Hologram: Liquid Crystal Composites, *SPIE Proceedings*, vol. 1555, pp. 279-290, Jul. 24-25, 1991.

R. L. Sutherland, "Optical Limiters, Switches, and Filters Based on Polymer Dispersed Liquid Crystals," *SPIE Proceedings*, vol. 1080, pp. 83-90, Jan. 17-18, 1989.

A. M. Lackner, et al., "Droplet Size Control in Polymer Dispersed Liquid Crystal Films," *SPIE Proceedings*, vol. 1080, pp. 53-61, Jan. 17-18, 1989.

Yamagishi, Frederick G., et al., "Morphological Control in Polymer-Dispersed Liquid Crystal Film Matrices," *SPIE*, vol. 1080, pp. 24-31, 1989.

Wu, Bao-Gang, et al., "Response Times and Voltages for PDLC Light Shutters," *Liquid Crystals*, vol. 5, No. 5, pp. 1453-1465, 1989.

Smith, G. W., et al., "The Interfacial Free Energy of Nematogen Droplets in an Isotropic Matrix: Determination of its Temperature Dependence from Coalescence Kinetics," *Mol. Cryst. Liq. Cryst.*, vol. 174, pp. 49-64, 1989.

G. von Bally, et al., "Gradient-Index Optical Systems in Holographic Endoscopy," *Applied Optics*, vol. 23, No. 11, pp. 1725-1729, Jun. 1, 1984.

Allan R. Tokuda, et al., "Holocamera for 3-D Micrography of the Alert Human Eye," *Applied Optics*, vol. 19, No. 13, pp. 2219-2225, Jul. 1, 1980.

Stephen A. Benton, et al., "One-Step White-Light Transmission Holography," *SPIE*, vol. 215, pp. 156-161, 1980.

Stephen A. Benton, et al., "One-Step White-Light Transmission Holography," *SPIE*, vol. 212, pp. 2-7, 1979.

Hori, Asai, and Fukai, "Field-Controllable Liquid-Crystal Phase Grating," *IEEE*, vol. ED-16, p. 1734 (4 pp.), 1979.

Edited by H. Bennett, "Cooncise Chemical and Technical Dictionary, FAIC" Chemical Publishing Co., Inc., 1974.

R. A. Kashnow and J. E. Bigelow, "Diffraction From a Liquid Crystal Phase Grating," *Applied Optics*, vol. 12, No. 10, pp. 2302-2304, Oct. 1973.

Kogelnik, Herwig, "Coupled Wave Theory for Thick Hologram Gratings," *The Bell System Technical Journal*, vol. 48, No. 9, pp. 2909-2947, Nov. 1969.

Stoke, Funkhouser, Leonard, Indebetoew, and Zech, "Hand-Held Holography," 1 p., Sep. 19, 1996.

G. W. Stroke and A. E. Labeyrie, "White-Light Reconstruction of Holographic Images Using the Lippmann-Bragg Diffraction Effect," *Physics Letters*, vol. 20, No. 4, pp. 368-370, Mar. 1, 1966.

Harbour, et al., "Angular Selectivity Asymmetry of Holograms Recorded in Near Infrared Sensitive Liquid Crystals Photopolymer materials," Opt. Commun., vol. 238(4-6), pp. 261-267 (Aug. 2004).

Burget, et al., Photopolymerization of Thiol-Ally Ether and Thiol Acrylate Coatings With Visible Light Photosensitive Systems, Polymer, vol. 45, pp. 6561-6567 (2004).

Garcia, et al., "Pyyromethene 567 Dye as Visible Light Photoinitiator for Free Radical Polymerization," Macromol. Chem. Phys., vol. 204(18), pp. 2233-2239 (2003).

Ghosh, et al., "Photopolymerization of Methyl Methacrylate Using a Combination of Rhodamine 6G and Benzoyl Peroxide as a Photoinitiator and Nonaqueous Media," J. Poly. Sci.: Pt. A, Poly. Chem., vol. 24, pp. 1053-1063 (1986).

Urano, et al., "Sensitization Mechanisms . . .," J. Photopolymer Sci. & Tech., vol. 14(2), pp. 251-258 (2001).

Non-Final Office Action for U.S. Appl. No. 11/399,516, dated Aug. 7, 2008, 11 pp.

Non-Final Office Action for U.S. Appl. No. 11/399,517, dated Aug. 8, 2008, 12 pp.

* cited by examiner

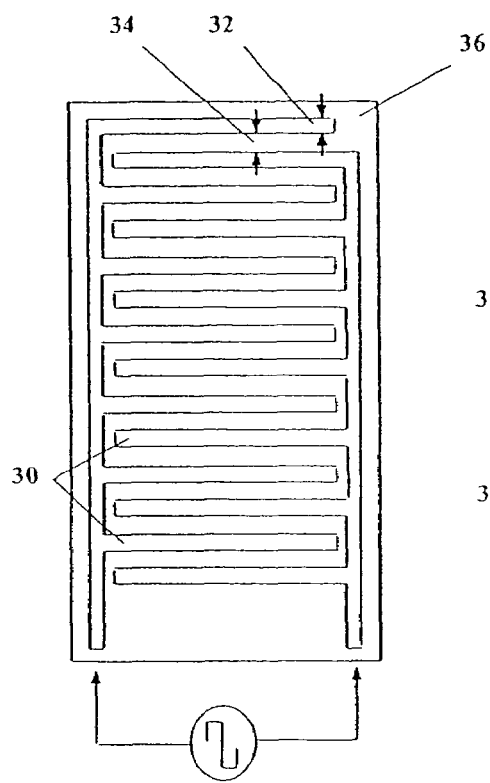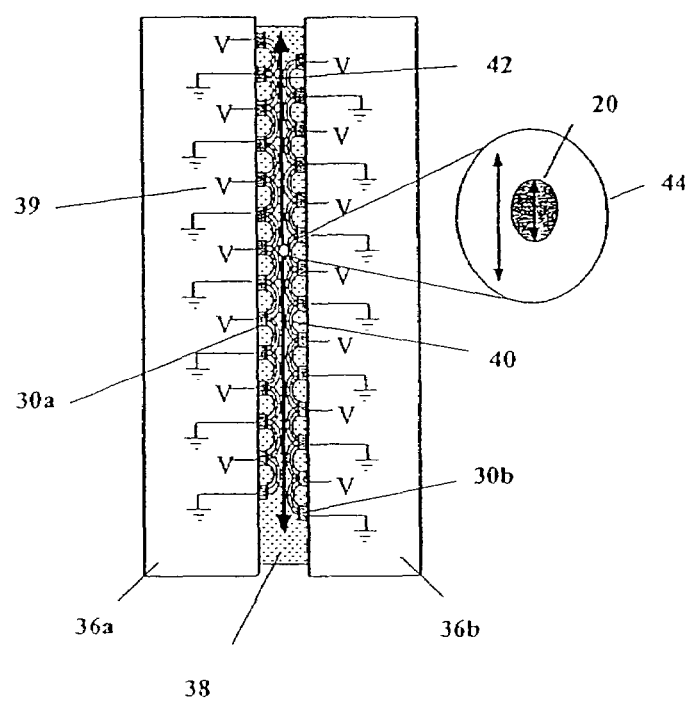
Figure 13aFigure 13b

OPTIMIZING PERFORMANCE PARAMETERS FOR SWITCHABLE POLYMER DISPERSED LIQUID CRYSTAL OPTICAL ELEMENTS

CROSS-REFERENCE TO RELATED APPLICATIONS

This application is a divisional of U.S. patent application Ser. No. 11/399,516 filed Apr. 7, 2006, which is a divisional of U.S. patent application Ser. No. 11/129,441, filed May 16, 2005, now U.S. Pat. No. 7,072,020, which is a divisional of U.S. patent application Ser. No. 10/408,259, filed Apr. 8, 2003, now U.S. Pat. No. 6,950,173. Each of the above-identified applications is incorporated herein by reference in its entirety.

BACKGROUND OF THE INVENTION

1. Field of the Invention

The purpose of this invention is to control and optimize the performance parameters of switchable holograms to tailor the properties to application-specific devices.

2. Description of the Related Art

U.S. Pat. No. 5,942,157 provides a description of materials and methods for producing switchable holographic Bragg gratings.

U.S. Pat. Nos. 5,751,452 and 5,748,272 to Tanaka et al. teach an optical device made from a switchable holographic polymer dispersed liquid crystal (hereafter "PDLC") grating and methods for fabricating the same. Tanaka et al teach the use of NOA65 (polyene and polythiol mixture), but do not teach how it may be used in conjunction with a multifunctional acrylate to reduce switching voltage and eliminate voltage creep. In their teaching, NOA65 is the sole polymerizable monomer in the described embodiments. These embodiments are also found in U.S. Pat. Nos. 4,938,568 and 5,096,282 to Margerum et al.

U.S. Pat. No. 5,875,012, and European Patent Application Nos. 98300541.1, 98300543.0, and 98300468.0 to Crawford et al. teach reflective displays made with switchable PDLC holograms, but provide little in the way of materials or methods for optimizing performance. Crawford et al. teach the use of an anisotropic polymer index-matched to the liquid crystal to reduce haze at large viewing angles. This is also taught in U.S. Pat. Nos. 4,994,204 and 5,240,636 Doane et al.

U.S. Pat. No. 5,731,853 to Taketomi et al. and U.S. Pat. No. 6,083,575 Ninomiya et al. teach devices made with switchable PDLC holograms, but provide no teaching for optimizing switchable hologram performance.

U.S. Pat. No. 5,313,317 to Saburi et al. and U.S. Pat. Nos. 5,330,264 and 5,648,857 to Ando et al. teach beam control methods for controlling unwanted gratings (i.e., "ghost holograms") in non-PDLC holograms using particular geometrical arrangements.

Each of the above-identified references is incorporated by reference herein in its entirety.

SUMMARY OF THE INVENTION

Summary of the Problem

Demand for information has become a strong driver in many business, consumer, and government applications. Three key components of this demand are the storage, transmission, and display of information. The latter two in particular are placing severe demands on available hardware and software. In communications, there has been an explosion of traffic driven by the Internet, business data, and digital image transfers. In the end-point use of this huge data stream, visual utilization and management of data have high priority. Large data content requires high resolution (SVGA to XGA) along with full-color capability. The technological response to these challenges has spawned several innovations. For telecommunications applications, part of the technological response is to provide higher data rates and bandwidth extension through the use of dense wavelength division multiplexing (DWDM). For easy visual access to information, portable and handheld devices are evolving along with flat screens and personal displays. In addition, efforts are underway to make the advantages of DVD and HDTV available in these formats.

Optics is at the core of all of these technologies. The information revolution is placing stringent demands on several optical components. For example, short and long-period fiber Bragg gratings are playing key roles in telecommunications, but the demand for multiple wavelengths and the ability for dynamic reconfiguration by DWDM is growing. In information display applications, the use of portable and micro-displays, combined with virtual display technology, is creating the need for complex off-axis optical systems in very compact, lightweight packages. This becomes impossibly heavy and cumbersome with conventional refractive and reflective optics.

Diffractive optics is the natural response to many of these demands. But these devices are by their very nature monochromatic. Multi-wavelength and dynamic reconfiguration capabilities are forcing a reconsideration of the use and fabrication of diffractive optical elements to satisfy the growing needs of the information revolution.

Switchable holographic optical elements (HOEs) have been invented to fulfill the promise of diffractive optics in meeting the technological challenges in telecommunications and information display. Multi-layered switchable holographic optical elements in a single solid-state device form a substitute for multiple static elements and complex refractive/reflective optical systems. This dramatic innovation has prompted one technology developer to coin the phrase "an optical system in a chip" as an apt description of switchable HOEs.

To be successful, switchable hologram technology must present a flexible approach to optical element design and fabrication, offering high efficiency and optical quality with low power consumption. Moreover, it must be tailored to customer specifications, i.e., it has to be very application-specific. For example, devices in telecommunications applications that require specific wavelength and format considerations include reconfigurable add/drop switches, multiplexers, optical cross connects, optical switches, wavelength selectors and tuners, and spectral attenuators or gain flatteners. Examples of such needs also abound in the information display area, including personal DVD/HDTV viewers, portable displays, data phone/handheld Internet displays, wearable PC displays, digital picture frames, desktop telephone E-mail/Internet displays, ultra-portable projection systems, and desktop monitors.

Summary of the Solution

Polymer-dispersed liquid crystal ("PDLC") holographic materials have now been successfully demonstrated in several components and prototype devices. These components and devices offer a solution to the need for an electronically driven, multi-layer, multi-wavelength, complex optical system in a thin, lightweight, low-electrical-power element. The fabrication of switchable holograms by the photopolymerization-induced phase separation of liquid crystal ("LC") from an initially homogenous pre-polymer mixture has been discussed in commonly owned U.S. Pat. No. 5,942,157. Prior to forming the hologram thereon, the pre-polymer mixture consists of a multi-functional acrylate monomer (or mixture of multi-functional monomers of differing functionality) combined with a mono-functional aromatic vinyl monomer and a LC, along with other key ingredients, including a photoinitiator dye. Similarly, the holographic recording process has also been described, employing a single-step method wherein coherent laser beams combine to form an interferogram in the plane of the pre-polymer mixture. As the system cures, the LC phase separates to form the hologram, consisting of a pure grating or mixture of gratings. These gratings are comprised of alternating LC-rich and polymer-rich regions.

As these switchable holographic materials and devices near application in the markets discussed above, it is becoming clear that several performance parameters are critical to the success of the devices employing this technology. For example, various applications of the switchable holographic-PDLC (hereafter "HPDLC") optical elements require polarized light, while others require diffraction of unpolarized light. Consequently, there is an advantage to having the capability to control the polarization dependence of the PDLC grating for specific applications.

Further, in many applications with holograms, haze is a problem. In HPDLC optical elements, haze is produced by light scattering from inhomogeneities in the HPDLC film component of the optical element. Some of these inhomogeneities are contaminants that can be controlled by careful processing. Others, however, originate from the phase-separated LC droplets. The diffraction planes themselves will produce some random scattering due to nonuniform distributions of LC droplets from plane to plane. However, a major source of scattering comes from phase-separated droplets that occur outside the desired Bragg planes. Examples of this are cross-gratings and diffraction rings formed by spurious reflections and diffraction of the recording beams. Also, in some cases LC may randomly phase separate in the polymer-rich regions. Scattering is a strong function of droplet size and density. In some cases, a haze as large as 10% has been measured. It is strongly desired to reduce and control the amount of haze in holograms for specific applications.

Further still, in electrically switchable holograms, minimization and control of power dissipation is an important consideration. Power dissipation leads to joule heating, which in some cases can cause problems with thermal stability. Also, large power consumption requires a more expensive electrical power supply and possibly larger voltages, which may lead to electrical shorting that destroys the hologram's usefulness. This depends largely on the switching voltage of the hologram. High switching voltage leads to large current drawn from the power supply. In switchable PDLC gratings, power consumption and dissipation comes from current drawn to charge up the transparent electrodes, as well as from resistive heating in the transparent electrodes and through the hologram, due to a finite conductivity of the PDLC material.

Switching speed requirements of the HPDLC optical elements depends on the intended application. Some applications may require on/off-switching times in the microsecond regime, while some may only require millisecond response. Consequently, it is useful to have the ability to tailor the switching speed to the application in order to optimize other parameters, such as switching voltage.

Some applications for the HPDLC optical elements place the elements in harsh environments that degrade its properties. Typical environmental parameters that prove deleterious to operation include temperature, humidity, and UV exposure, the most severe of these being temperature. LCs nominally have freezing points below 0° C. and nematic-to-isotropic (N-I) transition points at 65-100° C. The high temperature range is usually the most problematic in devices. Any contaminants or diluents in the LC will lower the LC's order parameter and thereby reduce its N-I transition. This in turn can significantly reduce diffraction efficiency. For example, the N-I transition may be reduced by as much as 30-40° C. by such contaminants/diluents. This severely restricts the operating temperature of the hologram. Consequently, the ability to control the environmental vulnerability of the HPDLC optical elements is desirable.

The current invention sets forth materials, mechanisms and procedures for optimizing various performance parameters in order to meet differing performance requirements. These optimization tailoring techniques include control and independent optimization of switchable HPDLC optical devices to meet the demanding requirements of anticipated applications for, inter alia, the telecommunications and display industries. These techniques include optimization of diffraction efficiency, i.e., index modulation, polarization dependence control, haze, cosmetic quality, control of response and relaxation time, voltage driving for on and off switching, and material uniformity. This control and independent optimization tailors properties of switchable HPDLC optical devices according to the specific requirements of the application of the switchable HPDLC optical device. The invention disclosed herein retains the desirable attributes of the multi-functional acrylate system for forming HPDLC optical devices, but adds new materials to the acrylate system and/or new process control to the recording to optimize performance parameters as may be needed for specific applications. This results in high optical quality switchable holograms with good diffraction efficiency and low, stable switching voltage.

A first embodiment of the present invention describes a system for controlling the index modulation of a polymer dispersed liquid crystal optical element. The system comprises a first substrate and a second substrate with a pre-polymer liquid crystal material therebetween; and a first and a second electrode pattern on each of the first and second substrates, wherein at least one of the first and second electrode patterns consists of interdigitated electrodes.

A second embodiment of the present invention describes a method for controlling the index modulation of a switchable polymer dispersed liquid crystal optical component. The method comprises providing a pre-polymer liquid crystal material between a first and second substrate, the first and second substrate having a first and second electrode pattern thereon, respectively, for applying a switching voltage to the switchable polymer dispersed liquid crystal optical component, wherein at least one of the first and second electrode patterns consists of interdigitated electrodes; applying a voltage approximately equal to the switching voltage to every other interdigitated electrode, creating an in-plane electric field within the pre-polymer liquid crystal material; holographically irradiating the pre-polymer liquid crystal material resulting in polymerization of the pre-polymer liquid crystal, wherein liquid crystal droplets formed from the holographic irradiation are formed with symmetry axes oriented in the same direction as the in-plane electric field; and removing the voltage approximately equal to the switching voltage once polymerization is complete.

A third embodiment of the present invention describes an inverse mode switchable grating system. The system comprises a holographically polymerized polymer dispersed liquid crystal material having a switchable grating formed therein; and at least a first and a second electrode for applying a switching field to the switchable grating in order to vary a diffraction efficiency thereof, wherein application of the switching field increases the diffraction efficiency of the switchable grating and removal of the switching field decreases the diffraction efficiency of the switchable grating.

A fourth embodiment of the present invention describes a method for switching a holographic diffraction grating via a switching field between a first diffraction efficiency and a second diffraction efficiency. The method comprises orienting the holographic diffraction grating such that an internal angle of p-polarized light incident thereon satisfies the following condition for a switching field of zero, $$\tan\theta_\rho = \left(\frac{\varepsilon_{xx}^{(1)}}{\varepsilon_{zz}^{(1)}}\right)^{1/2}$$

wherein $\theta_\rho$ is the angle of incidence of a reference wave of the incident light and $\varepsilon_{xx}^{(1)}$ and $\varepsilon_{zz}^{(1)}$ are the x and z components of the modulation of the dielectric tensor for a material comprising the holographic diffraction grating and the holographic diffraction grating has a first diffraction efficiency; and applying a switching field greater than zero in order to switch the holographic diffraction grating to a second diffraction efficiency.

A fifth embodiment of the present invention describes a method for splitting a light beam. The method comprises receiving a light beam at a holographically polymerized polymer dispersed liquid crystal material having an electrically controllable switchable grating formed therein; and controlling the application of an electric field to the switchable grating, wherein when no electric field is applied to the switchable grating the light beam is split into s-polarized light that is reflected from the switchable grating and p-polarized light that is transmitted through the switchable grating and further wherein when a threshold switching electric field is applied to the switchable grating the light beam is split into s-polarized light that is transmitted through the switchable grating and p-polarized light that is reflected from the switchable grating.

A sixth embodiment of the present invention describes a method for controlling the haze in a holographically polymerized polymer dispersed liquid crystal optical element. The method comprises forming a loosely gelled network within a pre-polymerized polymer dispersed liquid crystal material and holographically polymerizing the polymer dispersed liquid crystal material, including the loosely gelled network, to form the polymer dispersed liquid crystal optical element with decreased haze.

A seventh embodiment of the present invention describes a method for forming a holographically polymerized polymer dispersed liquid crystal optical element with reduced haze. The method comprises adding a pre-polymerized polymer dispersed liquid crystal material to a pre-existing loosely gelled network; placing the pre-existing loosely gelled network containing the pre-polymerized polymer dispersed liquid crystal material between first and second transparent substrates; and interfering a first beam and a second beam within the pre-existing loosely gelled network containing the pre-polymerized polymer dispersed liquid crystal material to form the holographically polymerized polymer dispersed liquid crystal optical element with reduced haze.

An eighth embodiment of the present invention describes a method for driving a polymer dispersed liquid crystal hologram. The method comprises providing a polymer dispersed liquid crystal hologram between a first and second substrate, the first and second substrate having a first and second electrode pattern thereon, respectively, for applying a switching voltage to the polymer dispersed liquid crystal hologram, wherein the first and second electrode patterns consist of interdigitated electrodes; applying a first voltage scheme, wherein a voltage approximately equal to the switching voltage is applied to the interdigitated electrodes on the first substrate and the interdigitated electrodes on the second substrate are connected to ground in order to drive the polymer dispersed liquid crystal hologram off; and removing the first voltage scheme and applying a second voltage scheme, wherein a voltage approximately equal to the switching voltage is applied to every other interdigitated electrode on the first and second substrates and the intermittent electrodes therebetween are connected to ground in order to drive the polymer dispersed liquid crystal hologram on.

BRIEF DESCRIPTION OF THE FIGURES

In the Figures:

FIGS. 13a and 13b show electrode configurations for aligning LC droplets during formation of a HPDLC optical element according to an embodiment of the present invention;

DETAILED DESCRIPTION OF THE PREFERRED EMBODIMENTS OF THE PRESENT INVENTION

Figure 1:
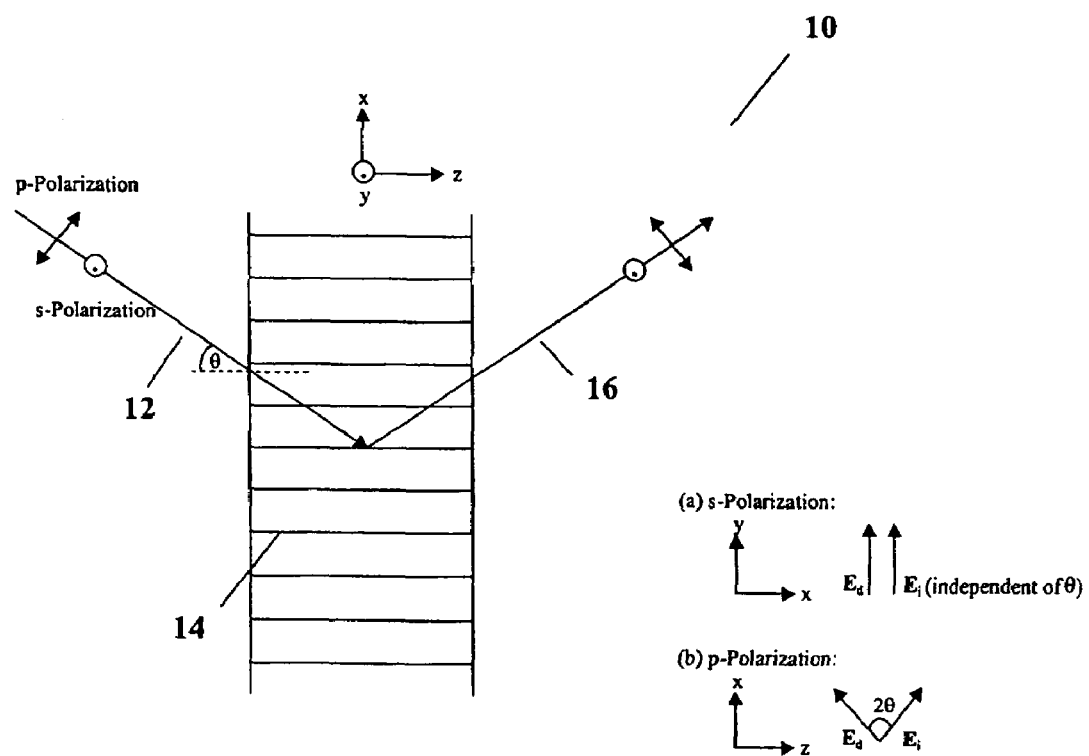
FIG. 1 shows a conventional diffraction geometry for a Bragg transmission grating.

The preferred embodiments of the present invention utilize the materials and/or process controls as set forth in the second column of Table 1 in order to optimize the corresponding performance parameters of the first column of Table 1.

TABLE 1

| Performance Parameters | Materials/Process Control |
| --- | --- |
| Diffraction efficiency (index modulation) | Nematic director control Fringe stability/contrast Gel network pre-stabilization |
| Polarization dependence | Nematic director control |
| Haze | Gel network pre-stabilization Index matching (Fresnel reflections & scattering) |
| Cosmetic quality | Gel network pre-stabilization Index matching (Fresnel reflections & scattering) |
| Inverse mode switching | Anisotropic grating parameters |
| Switching contrast ratio (dynamic range) | LC droplet size/shape |
| Response/relaxation time | LC droplet size/shape Electrode design/voltage drive scheme |

In order to provide a context for the implementation of the optimization materials and techniques of the preferred embodiments of the present invention, the base features of the HPDLC optical devices are described below. The HPDLC optical devices consist of a homogeneous mixture of ingredients (i.e., "pre-polymer material") that includes the following: a polymerizable monomer (mixture of multi-functional acrylates, including at least a pentaacrylate), liquid crystal ("LC") material (typically a mixture of cyanobiphenyls), a photoinitiator dye (one dye with absorption spectrum overlapping recording laser wavelength), a co-initiator, a reactive diluent (formerly called cross-linking agent), and a surfactant-like additive (formerly called surfactant). Specific examples of the homogeneous mixtures, as well as other formation process and material descriptions supporting the embodiments described herein are found in U.S. Pat. No. 5,942,157 and U.S. patent application Ser. Nos. 09/033,512 entitled "Switchable Volume Hologram Materials and Devices," filed Mar. 2, 1998; 09/033,513 entitled "Switchable Volume Hologram Materials and Devices," filed Mar. 2, 1998; 09/033,514 entitled "Switchable Volume Hologram Materials and Devices," filed Mar. 2, 1998; 09/034,014 entitled "Switchable Volume Hologram Materials and Devices," filed Mar. 2, 1998; 09/429,645 entitled "Switchable Volume Hologram Materials and Devices," filed Oct. 29, 1999; 09/347,624 entitled "Switchable Volume Hologram Materials and Devices," filed Jul. 2, 1999; 09/363,169 entitled "Electrically Switchable Optical Couplers and Reconfigurable Optical Polymer Dispersed Liquid Crystal Materials Including Switchable Optical Couplers and Reconfigurable Optical," filed Jul. 29, 1999; 09/742,397 entitled "Switchable Polymer-Dispersed Liquid Crystal Optical Elements," filed Dec. 22, 2000; 09/577,166 entitled "Volume Hologram Replication System and Method for Replicating Volume Holograms," filed May 24, 2000; and 10/303,927 entitled "Tailoring Material Composition for Optimization of Application-Specific Switchable Holograms" filed Nov. 26, 2002; and U.S. patent application Ser. Nos. 09/033,512, 09/033,513, 09/033,514, 09/034,014, 09/429,645, 09/347,624, and 09/363,169, each of which is incorporated by reference herein in its entirety.

When the pre-polymer material is irradiated holographically, the photoinitiator absorbs light in the bright fringes and reacts with the co-initiator, creating free radicals. The free radicals then initiate polymerization of the multi-functional acrylates. The free-radical process is very fast, and a three-dimensional polymer network is created in just a few seconds. This rapid development of a densely cross-linked network is critical to the phase separation of small LC droplets in the dark fringes, which is what establishes the hologram. Highly functional acrylates are needed in order to produce this with a minimal exposure time. A short exposure time is important in holography to reduce the effects of unwanted vibrations and other perturbations that tend to wash out the index modulation, and to make the process more amenable to mass production. In addition, the resulting rapid polymerization and phase separation are favorable for the formation of small LC droplets, which reduces random scattering losses (i.e., haze). The surfactant further contributes to reducing LC droplet size, yielding an optically clear hologram.

The three-dimensional network that results from the acrylates contributes to "squeezing" the LC out into a separate phase and to yielding desirable optical properties for the hologram. In fact, the hologram and its switchability would not be possible without these elastic attributes of the polymer. However, these strong elastic forces also make the polymer matrix very stiff. The stiffness contributes to a high switching voltage for the HPDLC optical devices. Moreover, the multi-functionality leads to continual post-polymerization after the hologram recording is completed. This stiffens the matrix further and slowly drives the switching voltage up. This is referred to as voltage creep. In some cases the voltage creep can increase the switching voltage by as much as 100%. The elastic relaxation of the multi-functional acrylate system also produces another phenomenon: shrinkage. This can be seen in reflection holograms where the wavelength of the Bragg reflection peak will blue shift due to shrinkage of the grating period. Although not completely understood, it appears that shrinkage has a major effect in a direction parallel to the grating vector. Hence, in reflection gratings, this reduces the grating period, which can in most cases be compensated by appropriate recording conditions (e.g., compensating recording angles). However, there appears to be a more deleterious effect in transmission holograms where the grating vector is in the plane of the hologram. Shrinkage in the plane of the hologram while recording appears to produce non-uniformity in the hologram. The shrinkage is not uniform, but creates elastic instability in the system, causing it to deform. This can almost be described as a "wrinkling" of the hologram with concomitant non-uniformity in the diffraction efficiency and cosmetic defects in the hologram's appearance.

HPDLC optical devices also exhibit unique polarization dependence. In FIG. 1, we show incident and diffracted beams with two different polarization states: (a) perpendicular to the plane containing the incident, diffracted, and grating wavevectors (commonly known as s-polarization), and (b) in this plane (commonly known as p-polarization). In prior art switchable Bragg transmission grating 10, an incident beam of light 12 is deflected by a diffraction grating 14 over a considerable angle that is equal to twice the Bragg angle for the wavelength of incident light, producing a diffracted exit beam 16. It is well known that for an ordinary grating, s-polarized light will have a stronger coupling (and hence larger diffraction efficiency) than p-polarized light. The reason is that there is a complete overlap of the electric field vectors for the incident and diffracted waves for s-polarization independent of angle of incidence. The overlap of p-polarized beams depends on the angle between the two beams, going from complete overlap for 0° angle to zero overlap for a 90° angle. Hence, for an ordinary grating, the diffraction efficiency of p-polarized light should never exceed that of s-polarized light.

However, in PDLC gratings of the type in FIG. 1 the opposite occurs: the diffraction efficiency of p-polarized light always exceeds that of s-polarized light. Therefore, in the type of PDLC grating considered in FIG. 1, there is a built-in anisotropy that favors diffraction of light polarized in the plane containing the wavevectors and the grating vector, even though the overlap of field vectors is smaller for this case than for the perpendicular polarization.

Figure 2:
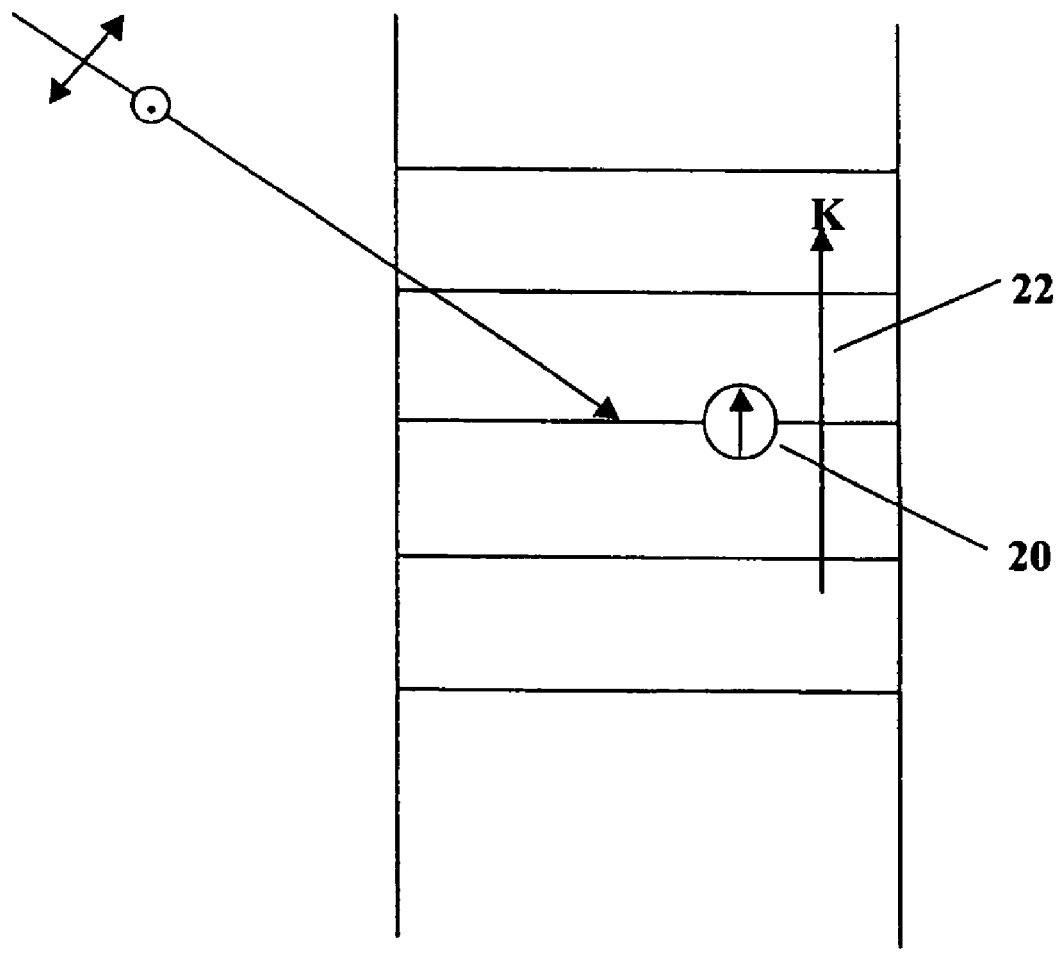
FIG. 2 shows a model depicting the diffraction and polarization properties of light in a HPDLC optical device according to an embodiment of the present invention.
Figure 3:
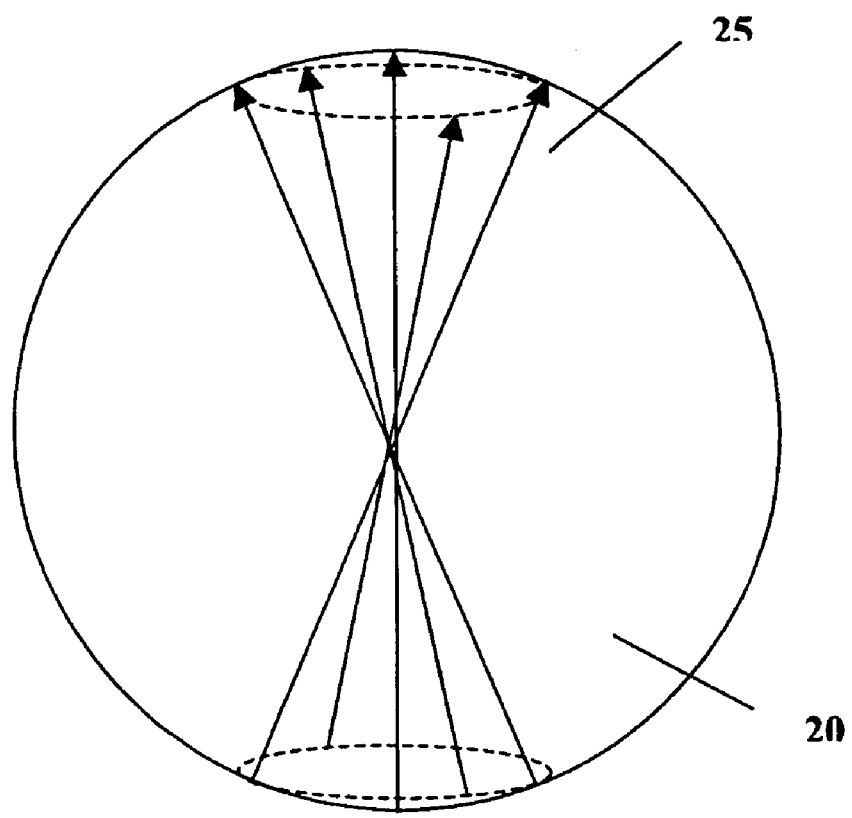
FIG. 3 shows the distribution of symmetry axes in LC domains of a HPDLC optical element according to an embodiment of the present invention.
Figure 4:
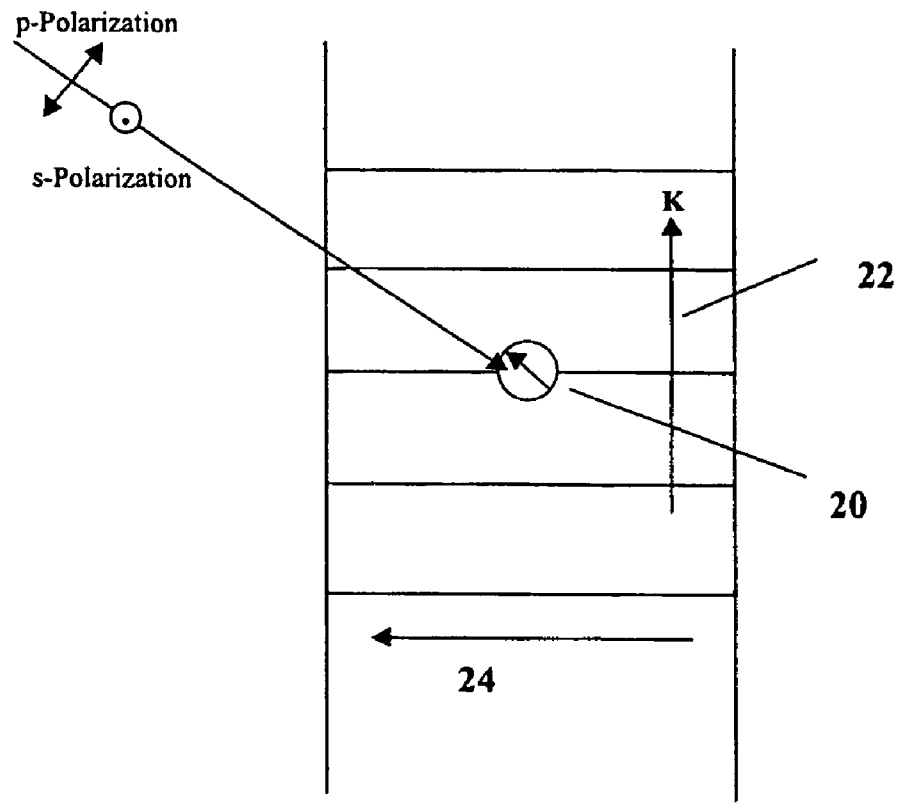
FIG. 4 shows the orientation of a LC domain symmetry axis in the presence of an electric field according to an embodiment of the present invention.

A simple model can explain these results, the LC phase separates as uniaxial domains 20 with symmetry axis pointed preferentially along the grating vector 22 as shown in FIG. 2. The resulting domain 20 has an extraordinary index of refraction $n_e$ along this symmetry axis, and a smaller ordinary refractive index $n_o$ perpendicular to the axis. Since p-polarized light has a component of its electric field along the symmetry axis, it sees a refractive index heavily weighted by $n_e$, and thus sees a relatively large index modulation. On the other hand, s-polarized light sees a refractive index weighted more by $n_o$, and hence experiences a relatively small index modulation ($n_e > n_o$). Experimentally, the diffraction efficiency of s-polarized light is considerably weaker than that of p-polarized light. The symmetry axes of LC domains 20 are not perfectly aligned with the grating vector 22. There is some small statistical distribution 25 of the axes about this direction. The average of the statistical distribution 25 points along the grating vector 22 as shown in FIG. 3. The average points along the grating vector. Thus, s-polarized light will see a small amount of $n_e$ mixed in with $n_o$, which is what gives it its weak but measurable diffraction efficiency. We note that when a strong electric field 24 is applied perpendicular to the plane of the grating vector 22, as shown in FIG. 4, nearly all LCs reorient in a direction along the beam propagation for some field value, and both s and p-polarized light see the same index in the LC domains 20, approximately equal to $n_o$. Since this index nearly matches the index of the surrounding polymer, the index modulation for both polarization states disappears. The grating is said to be switched "off." Additionally, as the field strength is further increased, the LCs will eventually orient parallel to the field and thus not be in an orientation to yield zero index modulation. Hence, the diffraction efficiency goes through a minimum near zero and then increases slightly with increasing field.

LC droplets form as nanoscale domains in HPDLC gratings. Detailed studies by scanning electron microscopy (SEM) have revealed that these domains can be roughly ellipsoidal, but are quite often irregularly shaped. The nematic configuration of LC molecules in micrometer scale droplets has been successfully predicted in computer simulations and observed by optical microscopy. A common arrangement of nematic directors in a spherical droplet is the so-called bipolar configuration, which has an axis of symmetry along a diameter and two point defects at the polls. Computer simulations reveal that a similar pattern is obtained in slightly elongated droplets. The nematic configuration in nanoscale domains is more elusive. However, nuclear magnetic resonance spectroscopy of deuterated-LC samples suggests that LC domains may contain a line defect along their long axes. Optically, these droplets appear to possess an axis of symmetry and behave as uniaxial domains.

A model was developed for the behavior of elongated LC droplets subjected to an electric field as described in Wu et al. Liq. Cryst. 5, 1453 (1989) which is incorporated herein by reference in its entirety. This model ignored the details of the nematic configuration and assumed that the droplet is characterized by a single vector, which they called the droplet director N. In the absence of an electric field, N coincides with the symmetry axis, which is also the major axis of the elongated droplet. This uniaxial domain has a dielectric anisotropy that is approximately equal to that of the bulk LC. Therefore, in the presence of an electric field N will attempt to reorient along the direction of the applied field. This reorientation is resisted by an elastic torque, which arises due to the elastic distortion produced by the applied field. The elastic torque is related to the local radius of curvature and some average elastic force constant of the droplet. A new equilibrium orientation of N is established by the condition that the elastic restoring torque balances the electrical torque. It is assumed that nanoscale LC droplets can be treated in the same way and this model is also applied to HPDLC gratings.

Assuming the LC droplets are uniaxial domains, they can be characterized by a diagonal dielectric tensor in the reference frame of the droplet. Let $\epsilon_\perp$ and $\epsilon_\parallel$ be the dielectric constants perpendicular and parallel to N, respectively. At optical frequencies, the respective refractive indices are given by $n_\perp = (\epsilon_\perp/\epsilon_0)^{1/2}$ and $n_\parallel = (\epsilon_\parallel/\epsilon_0)^{1/2}$, where $\epsilon_0$ is the permittivity of free space. Because the nematic director configuration is not uniform within the droplet, it is expected that $n_\perp > n_o$ and $n_\parallel < n_e$, where $n_o$ and $n_e$ are the ordinary and extraordinary refractive indices, respectively, of the bulk LC.

Figure 5:
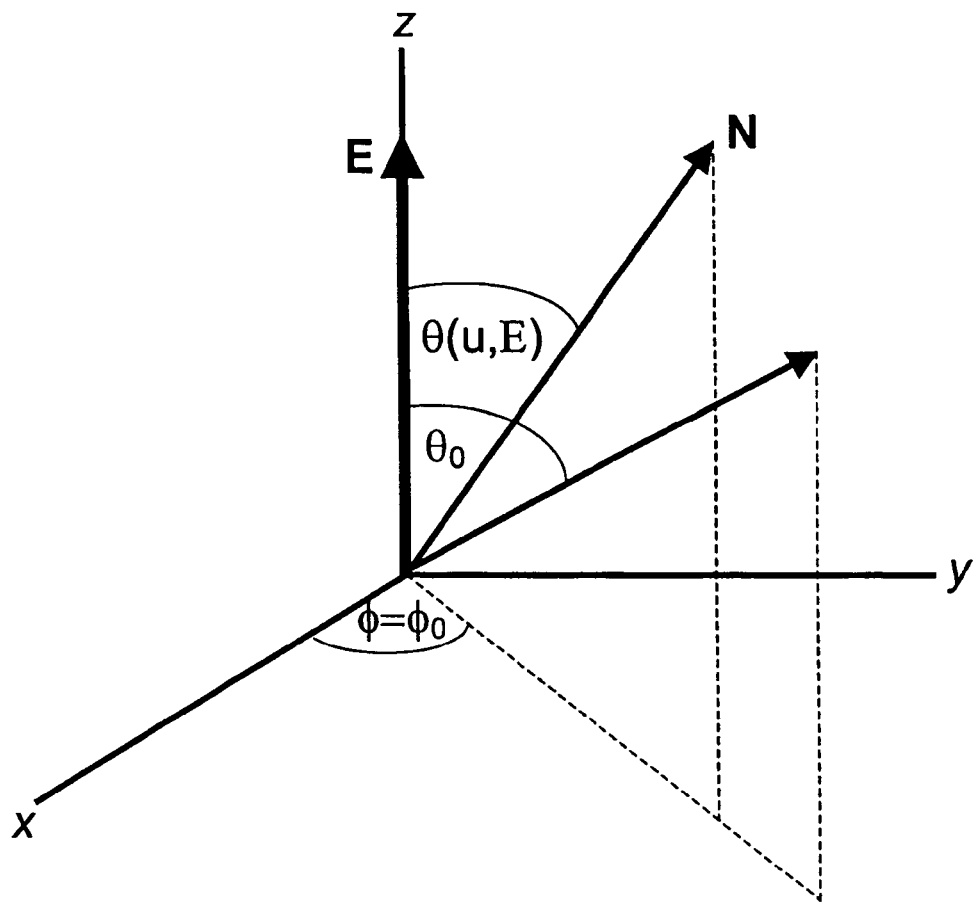
FIG. 5 shows the orientation of an LC droplet director N relative to a laboratory reference frame xyz according to an embodiment of the present invention.

The orientation of the droplet director N relative to a laboratory reference frame xyz is illustrated in FIG. 5. The electric field is assumed to be applied along the z axis as shown. The orientation of N is described by spherical angles θ and φ in the laboratory frame. The model of Wu et al. predicts that the field dependent equilibrium angle of N is given by $$\theta(u, E) = \frac{1}{2}\tan^{-1}\left[\frac{2u\sqrt{1-u^2}}{2u^2 - 1 + (E/E_c)^2}\right] \quad (1)$$

where $u = \cos\theta_0$, with $\theta_0$ the polar angle in the absence of an applied field, E is the electric field strength, and $E_c$ is a critical field for switching. Notice that the azimuth angle φ is unchanged by the field.

In the laboratory reference frame the droplet dielectric tensor $\epsilon_d$ is given by $$\epsilon_d = R^{-1}\begin{pmatrix} \epsilon_\perp & 0 & 0 \\ 0 & \epsilon_\perp & 0 \\ 0 & 0 & \epsilon_\parallel \end{pmatrix} R \quad (2)$$

where R is the rotation matrix that transforms the laboratory coordinate frame into the droplet coordinate frame, given by $$R = \begin{pmatrix} \cos\theta\cos\phi & \cos\theta\sin\phi & -\sin\theta \\ -\sin\phi & \cos\phi & 0 \\ \sin\theta\cos\phi & \sin\theta\sin\phi & \cos\theta \end{pmatrix} \quad (3)$$

and $R^{-1}=R^T$ is the inverse (transpose) of R. Explicitly, the droplet dielectric tensor is $$\varepsilon_d = \begin{pmatrix} \varepsilon_\perp + \Delta\varepsilon\sin^2\theta\cos^2\phi & \Delta\varepsilon\sin^2\theta\sin\phi\cos\phi & \Delta\varepsilon\sin\theta\cos\theta\cos\phi \\ \Delta\varepsilon\sin^2\theta\sin\phi\cos\phi & \varepsilon_\perp + \Delta\varepsilon\sin^2\theta\sin^2\phi & \Delta\varepsilon\sin\theta\cos\theta\sin\phi \\ \Delta\varepsilon\sin\theta\cos\theta\cos\phi & \Delta\varepsilon\sin\theta\cos\theta\sin\phi & \varepsilon_\perp + \Delta\varepsilon\cos^2\theta \end{pmatrix} \quad (4)$$

where $\Delta\varepsilon = \varepsilon_\parallel - \varepsilon_\perp$, $\theta$ is given by Eq. (1), and $\phi = \phi_0$ and $\theta_0$ are constants for a given droplet. The droplet directors N for an ensemble of droplets are distributed about some mean orientation direction given by $\bar{u}$ and $\bar{\phi}_0$ relative to the laboratory reference frame. The effective tensor modulation seen by light will be related to an average over this ensemble. The azimuth angle range is restricted from 0 to $\pi$ since the range from 0 to $2\pi$ includes $-N$, which is equivalent to N. In this analysis it is assumed that N has a symmetric distribution about $\theta=\pi/2$ and $\phi=\pi/2$. In an alternative embodiment, the orientational distribution may be skewed if some external force (e.g., shear) is applied to orient the droplets preferentially in some particular direction. In the present embodiment, it is assumed that the distribution function forms naturally, with no external influence, and has a symmetry that is dictated by the direction of the grating vector and the naturally occurring orientation of droplet directors relative to this vector. Additionally, in cases of slanted or curved gratings it may not be possible to assume symmetric orientational distributions, consequently, for these gratings additional assumptions must be made. The model described herein is useful to describe unslanted, planar reflection and transmission gratings. The immediate consequence of a symmetric distribution function is that all off-diagonal elements of the average droplet dielectric tensor vanish. This is because the off-diagonal elements in Eq. (4) are odd in either $\theta$ or $\phi$ about $\pi/2$.

For any given field strength E, each droplet will independently assume a new equilibrium orientation, described by Eq. (1), that is parameterized by its initial polar angle $\theta_0$. The azimuth angle will remain a constant determined by its initial value $\phi_0$. Hence the average tensor elements can be found by averaging over the initial orientation angles $\theta_0$ and $\phi_0$ by factoring the distribution function into two functions, one dependent on $\theta_0$ (or u) only and one dependent on $\phi_0$ only. Calling these normalized distribution functions $p(u)$ and $q(\phi_0)$, respectively, the average diagonal tensor elements for the droplet can be written as $$\langle\varepsilon_{dx}\rangle = \varepsilon_\perp + \Delta\varepsilon \int_0^\pi \int_{-1}^1 \sin^2\theta(u,E)\cos^2\phi_0 p(u)q(\phi_0)du\,d\phi_0 \quad (5)$$

$$\langle\varepsilon_{dy}\rangle = \varepsilon_\perp + \Delta\varepsilon \int_0^\pi \int_{-1}^1 \sin^2\theta(u,E)\sin^2\phi_0 p(u)q(\phi_0)du\,d\phi_0 \quad (6)$$

$$\langle\varepsilon_{dz}\rangle = \varepsilon_\perp + \Delta\varepsilon \int_{-1}^1 \cos^2\theta(u,E)p(u)du \quad (7)$$

It can be seen that these tensor elements depend on E through $\theta(u,E)$.

Figure 6A:
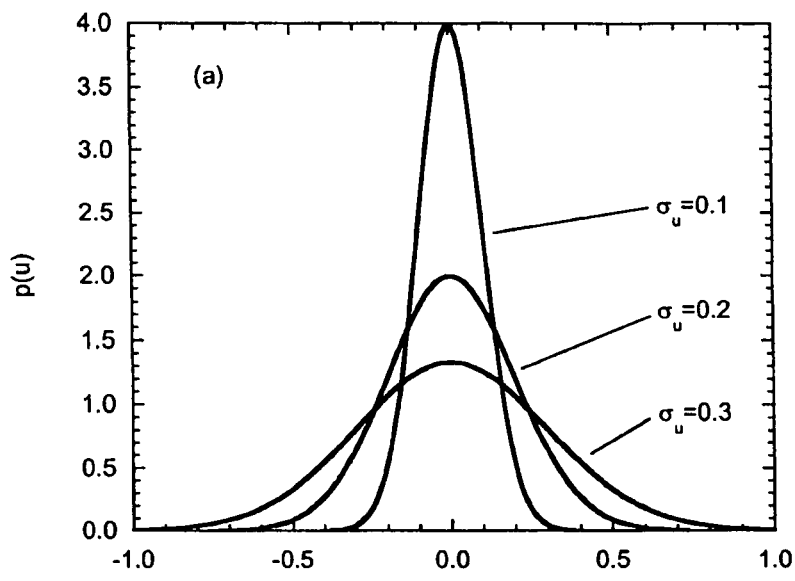
FIGS. 6a and 6b show the form of distribution functions used in an analysis of certain embodiments of the present invention.
Figure 6B:
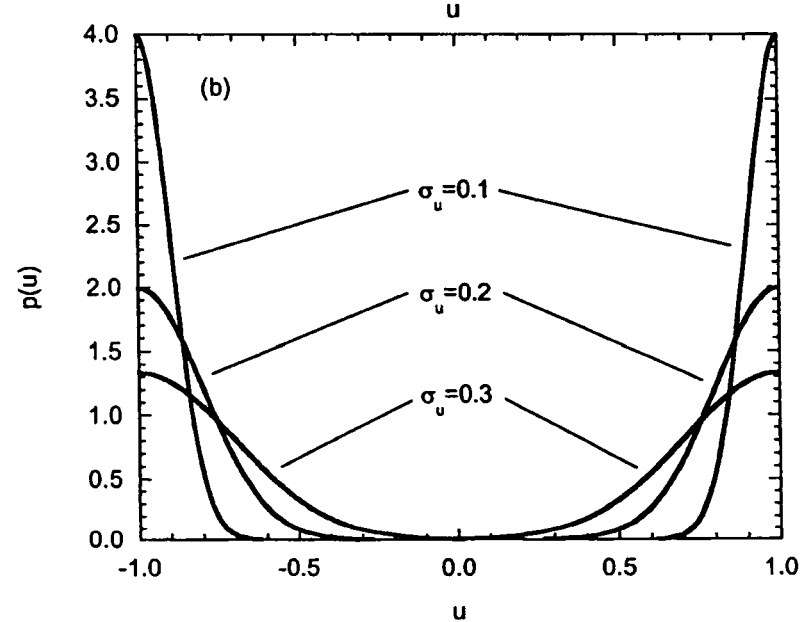
Figure 7A:
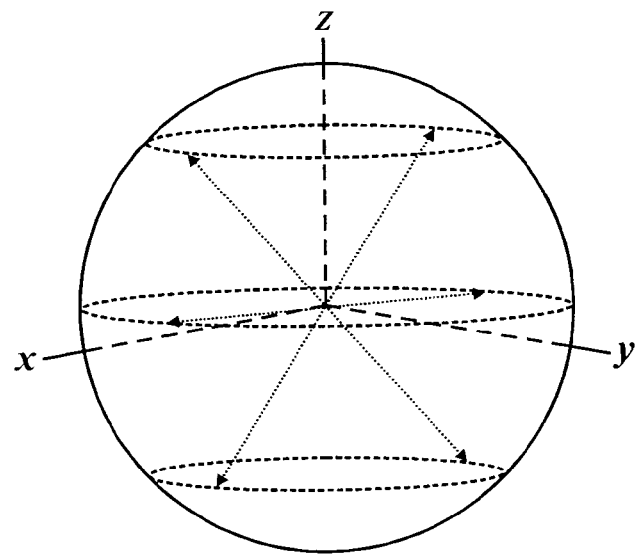
FIGS. 7(a) through 7(c) show the LC droplet direction distributions according to an embodiment of the present invention.
Figure 7B:
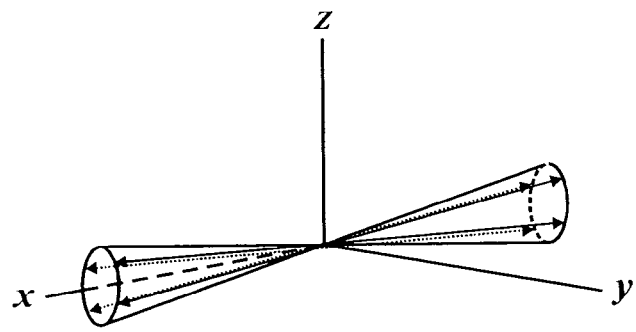
Figure 7C:
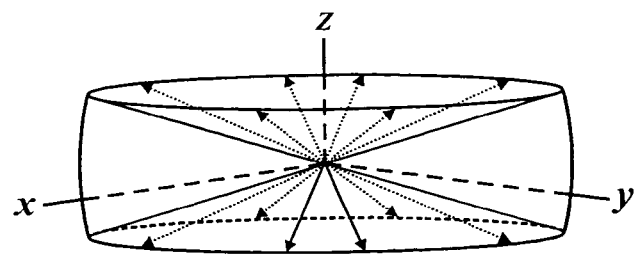

The form of the distribution functions is not known a priori and must be guessed. However, it is generally true that when dealing with a large number of statistically independent objects, the statistics of the ensemble tend to approximately obey a Gaussian distribution. Accordingly, make the assumption that $$p(u) = A\exp\left(-\frac{(u-\bar{u})^2}{2\sigma_u^2}\right) \quad (8)$$

$$q(\phi_0) = B\exp\left(-\frac{(\phi_0-\bar{\phi}_0)^2}{2\sigma_\phi^2}\right) \quad (9)$$

where $\bar{u}$ ($\bar{\phi}_0$) is the mean value of u ($\phi_0$), $\sigma_u$ ($\sigma_\phi$) is the standard deviation of the u ($\phi_0$) distribution, and A and B are appropriate normalization constants. Since the variables in this case are periodic and hence do not extend to $\pm\infty$, care must be taken in defining the normalization constants. If the standard deviation is small, the limits of integration in Eqs. (5)-(7) may be extended to $\pm\infty$ though, and the distributions will look like ordinary Gaussian functions. However, to retain the possibility that the standard deviations are not that small and that the distributions may tend toward constant values representing isotropic orientation functions, compute the normalization constants by integrating Eqs. (8) and (9) over the appropriate range of variables and set the values equal to 1. FIGS. 6a and 6b illustrate the form of the distribution functions used in this analysis. For example, if the distributions are centered about mean values $\bar{u}=0$ and $\bar{\phi}_0=\pi/2$, then the normalization constants in Eqs. (8) and (9) become $$A = \frac{2}{\sqrt{2\pi}\,\sigma_u\left[\text{erf}\left(\frac{1+\bar{u}}{\sqrt{2}\,\sigma_u}\right) + \text{erf}\left(\frac{1-\bar{u}}{\sqrt{2}\,\sigma_u}\right)\right]} \quad (10)$$

$$B = \frac{2}{\sqrt{2\pi}\,\sigma_\phi\left[\text{erf}\left(\frac{\bar{\phi}_0}{\sqrt{2}\,\sigma_\phi}\right) + \text{erf}\left(\frac{\pi-\bar{\phi}_0}{\sqrt{2}\,\sigma_\phi}\right)\right]}$$

where $$\text{erf}(s) = \frac{2}{\sqrt{\pi}} \int_0^s \exp(-t^2)dt \quad (11)$$

is the error function. Taking this approach, the values of the means and standard deviations can be varied independently to study the effects on diffraction efficiency and switching. They also give an intuitive interpretation of the droplet director distribution that is easy to visualize. For example, three distributions are shown in FIGS. 7(a), 7(b) and 7(c), for an isotropic distribution shown in FIG. 7(a), orientations clustered about the x axis, i.e., small $\sigma_u$ and $\sigma_\phi$, as shown in FIG. 7(b), and about the xy plane, i.e., small $\sigma_u$ but isotropic in $\phi_0$, as shown in FIG. 7(c).

For a mixture of two homogeneous, isotropic materials the effective dielectric constant of the medium can be expressed approximately by $\varepsilon = \varepsilon_a + f(\varepsilon_b - \varepsilon_a)$, where $\varepsilon_a$ and $\varepsilon_b$ are the dielectric constants of the host and dispersed materials, respectively, and f is the volume fraction of the dispersed material. This approximation holds as long as $\varepsilon_a \approx \varepsilon_b$. It is assumed that this relation can be applied to an anisotropic HPDLC medium as long as the dielectric tensors of the two materials are nearly equal component by component. For the HPDLC grating, the volume fraction f has the form of a periodic rectangular wave that is zero in the solid polymer region, and has a value $f_c$ in the PDLC region. The width of the PDLC region is $\alpha\Lambda$, where $\alpha$ is a fraction ($0 \leq \alpha \leq 1$) and $\Lambda$ is the grating period. To apply coupled wave theory this distribution is Fourier analyzed, keeping terms up to first order. The spatially periodic dielectric tensor can thus be written as $$\in(r) = \in^{(0)} + \in^{(1)} \cos(K \cdot r) \qquad (12)$$

where $$\varepsilon^{(0)} = (1 - \alpha f_c)\varepsilon_p + \alpha f_c \langle \varepsilon_d \rangle \qquad (13)$$

$$\varepsilon^{(1)} = \frac{2f_c}{\pi} \sin(\alpha \pi)(\langle \varepsilon_d \rangle - \varepsilon_p) \qquad (14)$$

In these equations, K is the grating vector ($|K|=2\pi/\Lambda$), $\langle \in_d \rangle$ is the average LC droplet dielectric tensor, and $\in_p$ is the polymer dielectric tensor. Assume that the polymer is isotropic so $(\in_p)_{ij} = \in_p \delta_{ij}$, where $\in_p$ is a scalar. Since $\langle \in_d \rangle$ is diagonal, $\in^{(0)}$ and $\in^{(1)}$ are also diagonal. Hence the laboratory frame also serves as the principal axes frame of the medium. Equation (13) yields the principal refractive indices of the medium, $n_i = (\in^{(0)}_{ii}/\in_0)^{1/2}$ (i=x, y, z). In general, the medium is biaxial ($n_x \neq n_y \neq n_z$) and electro-optical through the dependence of $\langle \in_d \rangle$ on E. The components of Eq. (14) are the dielectric tensor modulation elements that couple polarized optical waves in the diffraction grating.

Figures 8A, 8B:
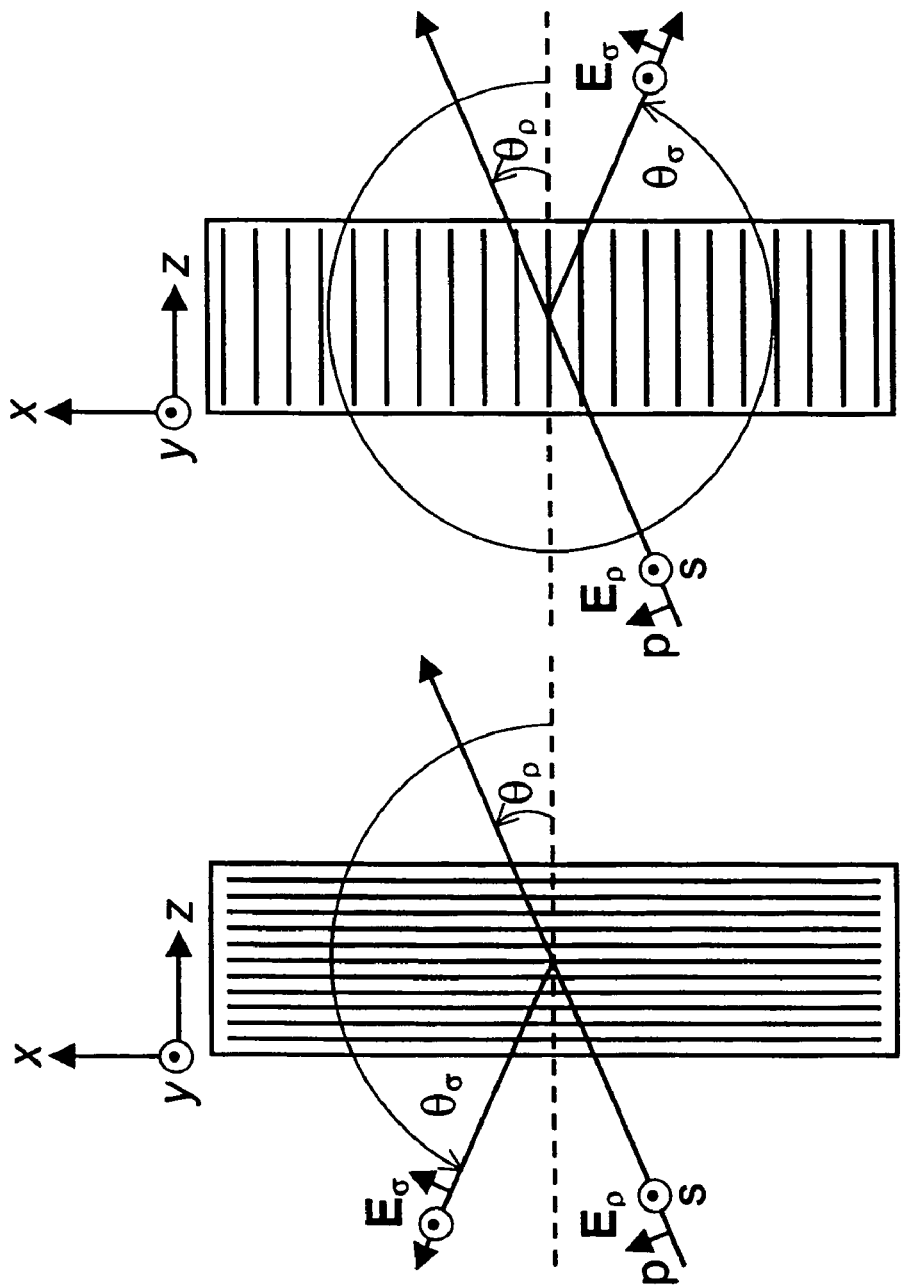
FIGS. 8(a) and 8(b) show coupled wave interaction for reflection and transmission gratings, respectively, according to embodiment of the present invention.

The coupled wave theory of Kogelnik et al., Bell Syst. Tech. J. 48, 2909 (1969) was recently extended to anisotropic media G. Montemezzani et al., Phys Rev. E. 55, 1035, (1997). Both of the references are incorporated herein by reference. The interaction of coupled waves in thick reflection and transmission holograms is illustrated in FIGS. 8(a) and 8(b). For a reflection grating, the grating vector is along the z axis as shown in FIG. 8(a), while for a transmission grating it is along the x axis as shown in FIG. 8(b). A field is applied along the z direction in both cases. In the Bragg regime, only the signal wave ($\sigma$) and the reference wave ($\rho$) couple substantially. For an s-polarized wave, i.e., polarization perpendicular to the plane of incidence, the optical field vector is along the y axis. For p-polarized light, i.e., polarization in the plane of incidence, the field vector lies in the xz plane. The angle of incidence of the reference wave is $\theta_\rho$ while the angle of diffraction of the signal wave is $\theta_\sigma$. These angles refer to the directions of the Poynting vectors of the reference and signal waves, respectively. A diagonal modulation tensor cannot couple s-polarized and p-polarized waves. Hence the signal and reference waves will have the same type of polarization (i.e., s or p). The coupling coefficient may be written as $$\kappa = \frac{\pi \hat{e}_\sigma \cdot \varepsilon^{(1)} \cdot \hat{e}_\rho}{2\varepsilon_0 n g \lambda \sqrt{|\cos\theta_\sigma|\cos\theta_\rho}} \qquad (15)$$

where $\hat{e}_\sigma$ ($\hat{e}_\rho$) is the unit vector of polarization for the signal (reference) wave, and $$n = \sqrt{n_\sigma n_\rho} \qquad (16)$$

with $n_\sigma$ ($n_\rho$) the refractive index for the signal (reference) wave. The parameter g is related to the walk-off angle $\delta$ between the Poynting vector and wave vector and is given by $$g = \sqrt{\cos\delta_\sigma \cos\delta_\rho} \qquad (17)$$

For unslanted gratings, $n_\sigma = n_\rho$ and $\cos\delta_\sigma = \cos\delta_\rho$. Notice that for an unslanted reflection grating $\theta_\sigma = \pi - \theta_\rho$, so $\cos\theta_\sigma \leq 0$. For an unslanted transmission grating $\theta_\sigma = 2\pi - \theta_\rho$ and $\cos\theta_\sigma \geq 0$. In unslanted gratings $|\cos\theta_\sigma| = \cos\theta_\rho$. The explicit expression of the coupling coefficient for s polarization is $$\kappa_s = \frac{\pi \varepsilon_{yy}^{(1)}}{2\varepsilon_0 n_y g_s \lambda \cos\theta_\rho} \qquad (18)$$

with $g_s = 1$, while for p polarization $$\kappa_p = \frac{\pi(\varepsilon_{yy}^{(1)} \sin^2\theta_\rho - \varepsilon_{zz}^{(1)} \cos^2\theta_\rho)}{2\varepsilon_0 n(\theta_\rho) g_p \lambda \cos\theta_\rho} \qquad (19)$$

with $$[n(\theta_\rho)]^{-2} = n_x^{-2} \cos^2\theta_\rho + n_z^{-2} \sin^2\theta_\rho \qquad (20)$$

and $$g_p = \frac{n_x^2 \cos^2\theta_\rho + n_z^2 \sin^2\theta_\rho}{[(n_x^2 \cos^2\theta_\rho + n_z^2 \sin^2\theta_\rho)^2 + (n_x^2 - n_z^2)^2 \sin^2\theta_\rho \cos^2\theta_\rho]^{1/2}} \qquad (21)$$

For weakly birefringent media ($n_x \approx n_z$), $g_p \approx 1$.

In the case of reflection gratings, the peak diffraction efficiency $\eta_j$ (j=s or p) of a reflection grating is $$\eta_j = \tanh^2(\kappa_j L) \qquad (22)$$

At off-normal incidence ($\theta_\rho \neq 0$) the coupling coefficient is given by Eq. (18) for s polarization and Eqs. (19)-(21) for p polarization.

Figure 9:
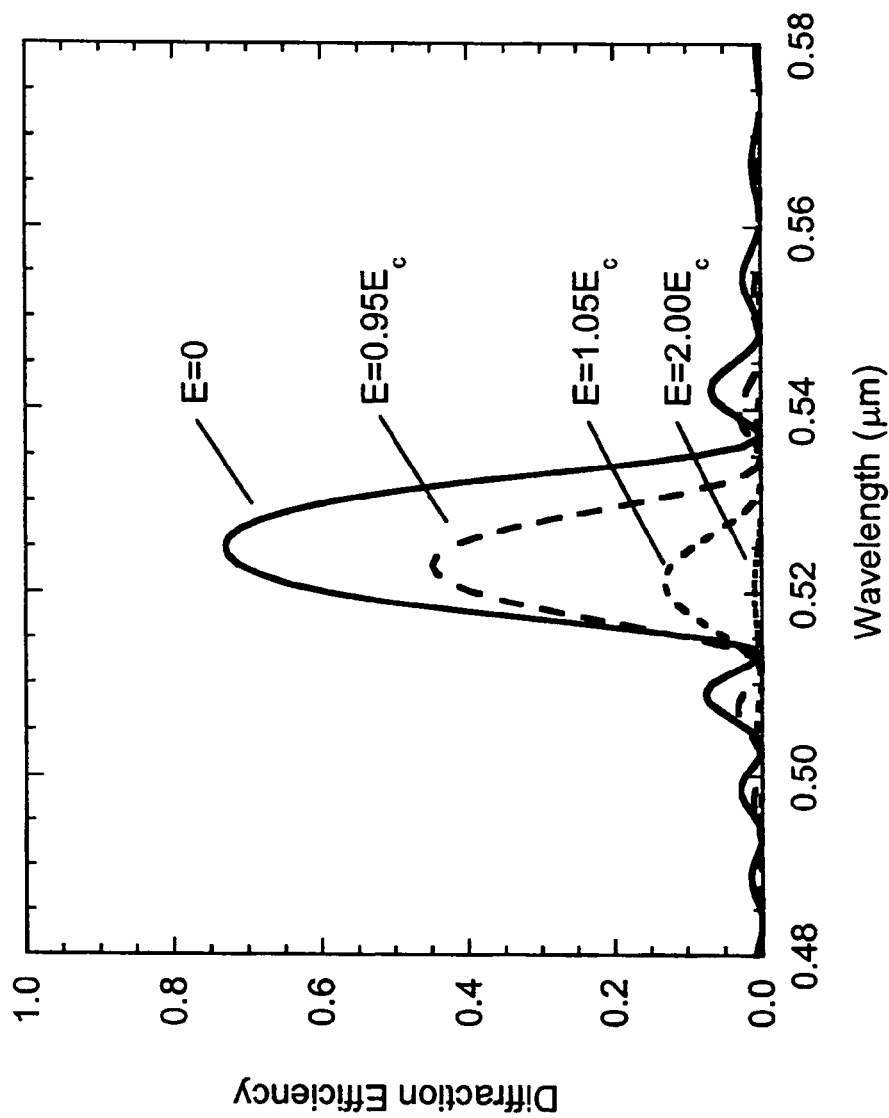
FIG. 9 shows electric field effects on diffraction efficiency of a grating at normal incidence according to an embodiment of the present invention.

Most of the LCs used in this analysis have similar values of $n_o$ and $n_e$. Hence the variation in diffraction efficiency between different systems is primarily due to the parameters $\alpha$ and $f_c$, which are related to LC solubility for various types of gratings and polymer systems, and to the distribution functions p(u) and q($\phi_0$), which also appear to be dependent on the type of grating and LC. In order to limit the variation of parameters, the index $n_p$ can be measured for the polymer and generally it is in the range of 1.52-1.54, depending on the amount of LC remaining in solution in the polymer. For s-polarized light, switching the grating to minimum diffraction efficiency implies that $n_\perp \approx n_p$ (see the discussion below). Hence the parameter $n_\perp$ can be fixed by this condition. The quantities $\alpha$ and $f_c$ can be estimated from SEM studies of HPDLC gratings. This leaves $n_{||}$ and droplet statistics, i.e., means $\bar{u}$ and $\bar{\phi}_0$ and standard deviations $\sigma_u$ and $\sigma_\phi$, as adjustable parameters to model experimental results. Information about statistical parameters can be obtained by observing the polarization dependence of the grating. In a particular embodiment for a reflection grating, the following values are selected for specified parameters: $n_p = 1.530$, $n_\perp = 1.535$, $n_{||} = 1.680$, $\alpha = 0.3$, $f_c = 0.7$. For these reflection gratings, a Bragg wavelength of 0.525 μm and a grating thickness L=8 μm are selected for this specific exemplary embodiment. For these values, the effect of an electric field on the spectral diffraction efficiency of a Bragg grating with light at normal incidence is illustrated in FIG. 9. For this example, the mean droplet director is at $\pi/2$ radians with respect to the grating vector (i.e., with respect to the z axis, $\bar{u}=0$) with an isotropic distribution of droplet directors in the xy plane (see FIG. 7c). The standard deviation $\sigma_u$ was selected to be 0.3. This implies that the droplet directors exhibit a preferential ordering tangential to the grating plane. This seems be a tendency of the Merck TL series of LCs (e.g., TL213). Symmetry about the grating vector would seem to imply that there should be no preferential direction of ordering in the plane of the grating. Therefore, at normal incidence the diffraction efficiency should be independent of polarization. Switching occurs for an applied field $\sim E_c$. As the grating switches, the peak of the reflection notch shifts toward the blue. This is due the field dependence of $n_y$ (or $n_x$), which decreases with increasing field (see Eqs. (1), (5), (6), and (13)).

Figure 10:
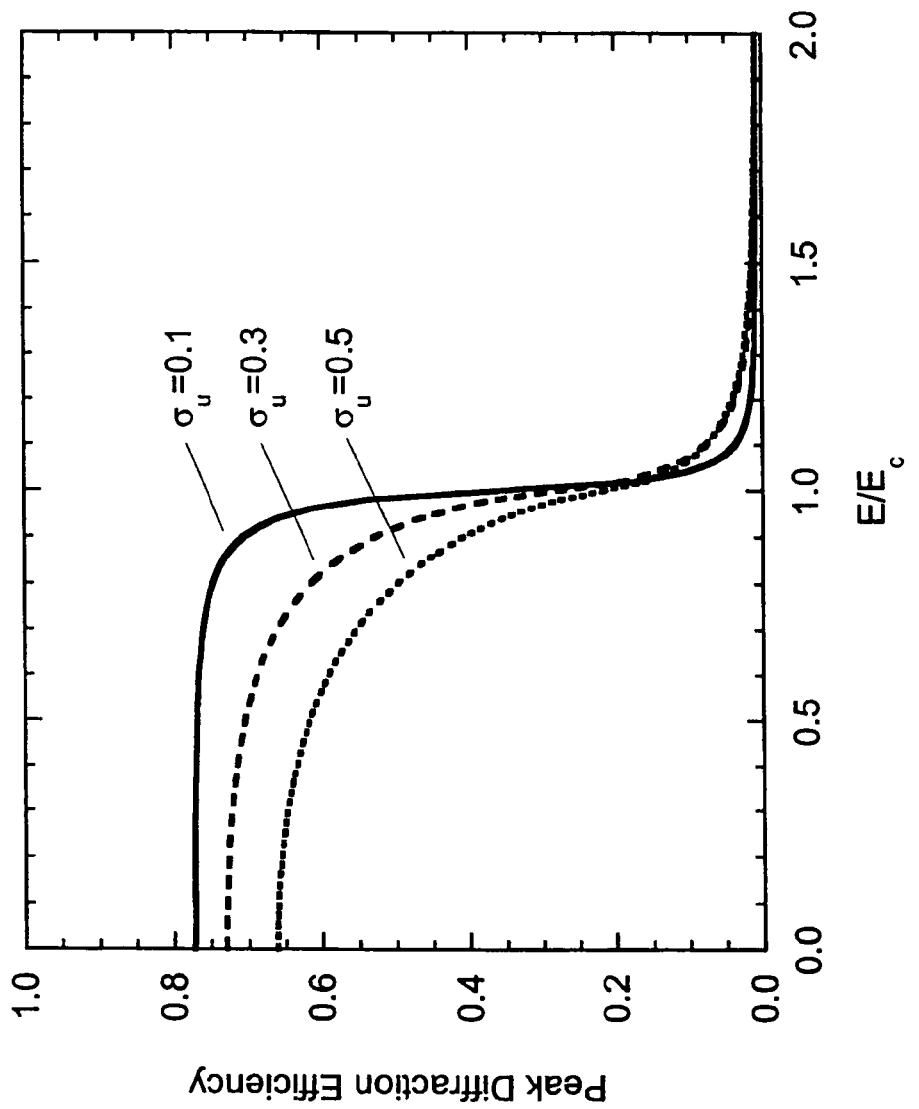
FIG. 10 shows a switching curve of a grating at normal incidence according to an embodiment of the present invention.

The width of p(u) has a noticeable effect on the sharpness of the switching curve. This is illustrated in FIG. 10 where the peak diffraction efficiency for $\theta_\rho=0$ is plotted as a function of field using different values of the standard deviation $\sigma_u$. Although the maximum diffraction efficiency at E=0 is affected somewhat, the more dramatic effect appears in the sharpness of the switching. Therefore, observing the form of an experimental switching curve allows one to draw an inference about the statistics of the initial droplet-director orientation distribution. The diffraction efficiency approaches a minimum asymptotically for increasing field strength. The minimum is near but not quite zero because the average droplet index approaches $n_\perp$, which is approximately equal to $n_p$. If $n_\perp=n_p$, then the asymptote would be zero. This switching by inducing a match of LC droplet index to polymer index is the classical type of switching observed in ordinary PDLCs and is called index switching.

Figure 11:
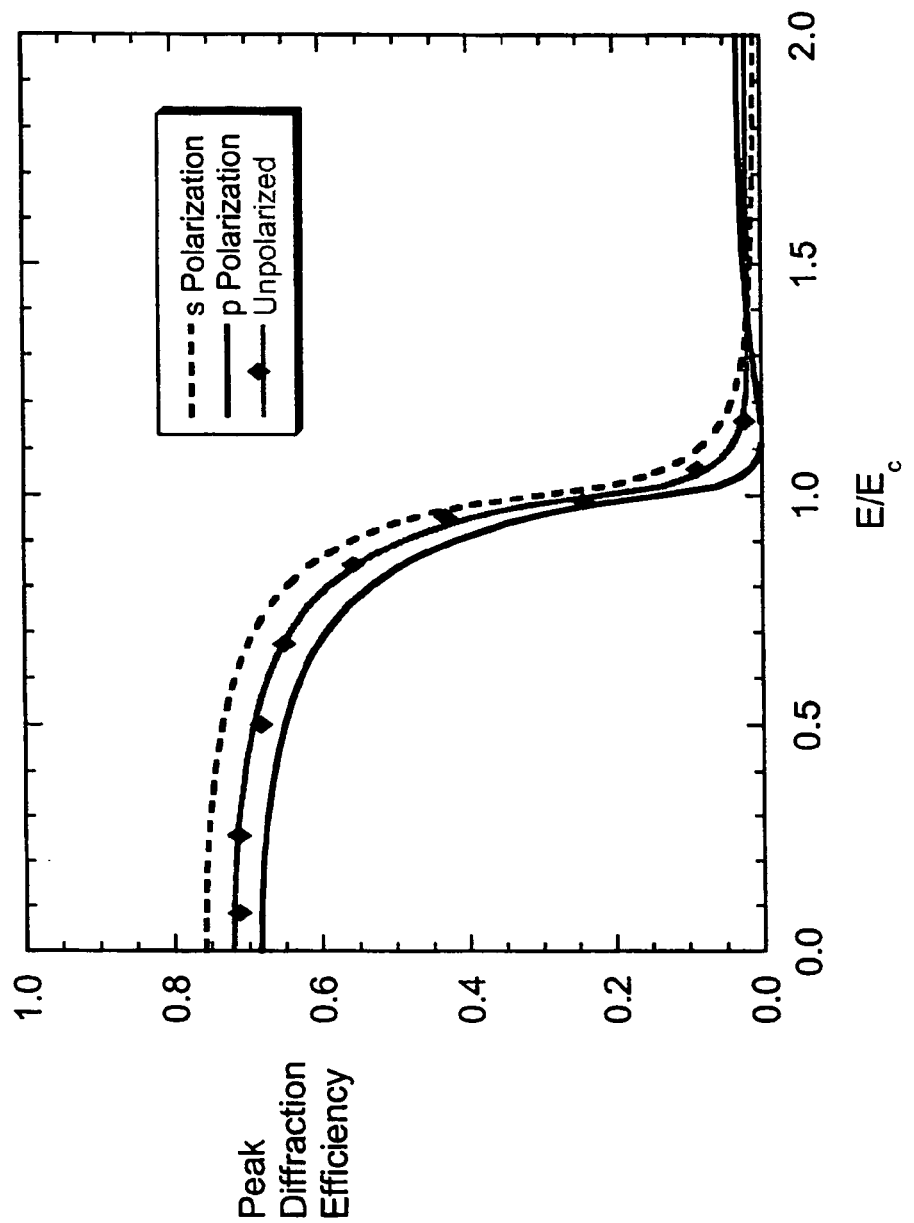
FIG. 11 shows the difference in switching behavior between normal and off-incidence radiation on a grating according to an embodiment of the present invention.

Alternatively, examining the same reflection grating at off-normal incidence, the plot in FIG. 11 shows peak diffraction efficiency as a function of applied field for s-polarized, p-polarized, and unpolarized light. All of the parameters are the same as previously given, with the exception that the angle of incidence is $\theta_\rho=0.1\pi$ (18°). FIG. 11 illustrates the difference in switching behavior between normal and off-normal incidence. A true zero in diffraction efficiency is achieved for p-polarization near $E_c$, with efficiency then showing an increase as the field is increased further. The diffraction efficiency for s-polarized light exhibits an asymptotic behavior similar to that seen at normal incidence. For unpolarized light, an average of the two curves for s and p polarization is displayed. It is difficult to obtain good switching behavior, i.e., high dynamic range, using unpolarized light at off-normal incidence because of the disparity between s-polarization and p-polarization, consequently, in a preferred embodiment, p-polarized light may be used to yield the highest dynamic range.

The results given above are due to the tensor nature of the grating. For s-polarization, the switching is asymptotic and based on index switching as described above, where for large field values the droplet index is $\sim n_\perp \approx n_p$. However, the case for p-polarization is quite different and cannot be described as an index matching. Referring to Eq. (19), the condition for the coupling coefficient $\kappa_p$ to vanish is $$\tan\theta_p = \left(\frac{\varepsilon_{xx}^{(1)}}{\varepsilon_{zz}^{(1)}}\right)^{1/2} \quad (23)$$

and this is achieved at some particular value of E. The form of Eq. (23) is reminiscent of the definition of the Brewster angle for isotropic systems and has an analogous physical interpretation. For light incident from an isotropic medium of index $n_1$ onto an isotropic medium of index $n_2$, the Brewster angle $\theta_B$ is the angle of incidence for which the reflectance of p-polarized light is zero. This can be calculated from electromagnetic theory and is based on the conditions dictated by Maxwell's equations at the boundary between the two media, with $\tan\theta_B = n_2/n_1$. At the Brewster angle, the rays transmitted to and reflected from the second medium are at a right angle. Brewster's condition has thus been given the following interpretation. For p-polarization, dipoles, i.e., oscillating electrons, are induced in the second medium in the plane of incidence and perpendicular to the transmitted ray. These dipoles radiate and create a reflected ray back into the first medium. However, dipoles do not radiate along a direction parallel to their direction of oscillation. At Brewster's angle, where the reflected and transmitted rays are at a right angle, the induced dipoles point along the direction of the reflected ray. Since they do not radiate any energy in this direction, the reflected ray vanishes. Although there is some controversy regarding this interpretation, it is true that for non-conducting, non-magnetic media, the only work term in the electromagnetic energy theorem that could contribute to the generation of an electric field E is the term proportional to $Re(i\omega E \cdot P^*)$, where P is the dielectric polarization induced in the medium. If E and P are orthogonal, the work term is zero and no energy can be expended to generate the field E, even though the wave associated with E satisfies the boundary conditions. This certainly applies to the situation of Brewster's law in isotropic media.

Applying a similar interpretation to Bragg diffraction in anisotropic media, in Eq. (19), the quantity $\in^{(1)} \cdot \hat{e}_\rho$ is a vector pointing in the direction of the spatially modulated part of the dielectric polarization induced by the reference field $E_\rho$. If this vector is perpendicular to $\hat{e}_o$, there can be no work done by the induced polarization to generate the signal wave $E_o$, even though the direction of this wave is consistent with the Bragg condition, and the coupling coefficient consequently vanishes. This occurs in unslanted isotropic gratings at an incident angle of $\pi/4$ where the induced polarization, in this case parallel to the reference field, is perpendicular to the signal field. For p-polarization the condition $\hat{e}_o \cdot \in^{(1)} \cdot \hat{e}_\rho = 0$ is equivalent to the condition given by Eq. (23), which is induced by the applied field. Hence the applied field induces a dielectric polarization orthogonal to the signal field to produce a zero in the diffraction efficiency, and this is called polarization switching.

Figure 12:
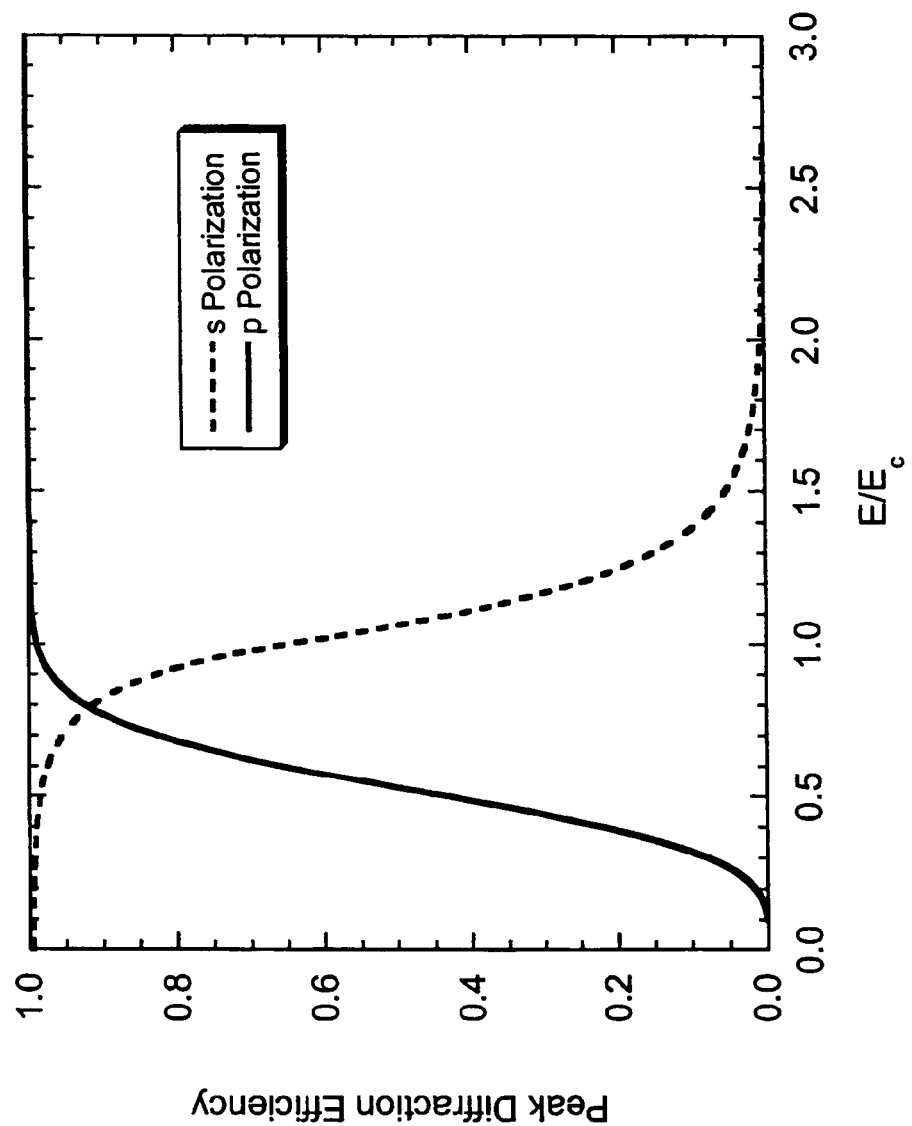
FIG. 12 shows the switching of p-polarized and s-polarized light according to an embodiment of the present invention.

Polarization switching of p-polarized light can be put to use in making an inverse mode HPDLC switchable reflection grating. An inverse mode grating is one for which the diffraction efficiency turns on to a high value when a voltage is applied. In normal mode HPDLC gratings a voltage turns the grating off (low diffraction efficiency). An inverse mode grating would be advantageous for certain applications, but is difficult to make using present materials. The concept is to orient the diffraction grating so that the internal incident angle of p-polarized light satisfies Eq. (23) at zero field. Thus the diffraction efficiency would be zero. When a field is applied, $\in_{zz}^{(1)}$ increases while $\in_{xx}^{(1)}$ decreases. By Eq. (19), the coupling coefficient increases and the grating turns on. An example of the switching of s-polarized and p-polarized light for such a situation is illustrated in FIG. 12. The conditions for this plot are: $n_p=1.530$, $n_\perp=1.530$, $n_\parallel=1.750$, $\alpha=0.5$, $f_c=0.9$, L=15 μm, $\lambda_B=0.525$ μm, $\theta_\rho=0.188\pi$ (33.8°), $\bar{u}=1$, $\sigma_u=0.4$, $q(\phi_0)=0.5$ (isotropic $\phi_0$-distribution). The grating is turned on for p-polarized light and off for s-polarized light at $E \sim E_c$. Hence the grating is in the inverse mode for p polarization and normal mode for s polarization.

A grating device as described herein can function as an electro-optical polarizing beam splitter. For example, at zero field incident unpolarized light would be split into s-polarized light, i.e., reflected and p-polarized light, i.e., transmitted. For an applied field >$E_c$, the opposite effect would be achieved: unpolarized light would be split into s-polarized light that is now transmitted and p-polarized light that is now reflected.

In a first embodiment of the present invention, a system and method for controlling index modulation through nematic director control, is described. For given LC birefringence and volume fraction, the index modulation can be maximized by maximizing the birefringence of the LC droplets. This is achieved by distorting the droplets and aligning the symmetry axes of each droplet in the same direction, which matches the polarization direction of the incident light. It is possible to do this by applying external stimuli that shape and orient the droplets as they are formed in the phase separation process. Techniques for achieving this using a magnetic field or an externally applied stress are disclosed in U.S. Pat. No. 5,942,157 to Sutherland et al., which is incorporated herein by reference in its entirety.

This first embodiment describes a method for distorting the droplets and aligning the symmetry axes of each droplet in the same direction using an electric field that is compatible with subsequent electrical switching of the HPDLC optical device. The pre-polymer/LC material is placed between glass plates with transparent electrodes as disclosed in U.S. Pat. No. 5,942,157. However, instead of transparent planar electrodes, the electrodes are patterned as illustrated in FIG. 13a. These are called interdigitated electrodes 30 or finger electrodes, with finger height h 32 and finger separation b 34. These electrode parameters, h and b, are adjusted for optimum performance. While these parameters may vary between device applications, an exemplary dimension is approximately 10 µm for both h and b, according to the relationship that the dimensions are approximately equivalent in size to the thickness of the HPDLC material. Both glass plates 36a and 36b are configured with interdigitated electrodes 30a and 30b, but the back plate 36b electrodes 30b are staggered with respect to the front plate 36a electrodes 30a as illustrated in FIG. 13b. In an alternative embodiment, the back electrode could be a solid planar electrode (not shown). The pre-polymer LC material 38 is irradiated holographically as disclosed in U.S. Pat. No. 5,942,157 to form either a reflection or transmission hologram (not shown). However, while the system is being cured, a voltage (V) 39 approximately equal to the switching voltage of the device is applied to every other finger electrode, with the same pattern applied to both front and back electrodes 30a and 30b. This is illustrated in FIG. 13b along with the resulting electric field pattern. The fringing fields 40 of each electrode superpose in the holographic medium to create an in-plane electric field 42. This field orients the LC nematic directors 20 in the forming droplets 44 along the same in-plane direction as the resulting electric field 42. This will also slightly distort the droplets in this direction, making it the elastically favored direction at equilibrium. When the system reaches gelation and the voltages 39 are removed, this orientation is locked in place. The resulting index modulation is maximized for incident light polarized in the same direction.

Alternatively, by applying different voltages, various degrees of polarization state between the parallel to the film plane to the perpendicular to the film plane may be achieved. The applied voltages are determined by the switching voltage and are approximately equal thereto. For light polarized in the direction of the LC droplet symmetry axes thus formed, the index modulation and hence the diffraction efficiency will be maximized. Light polarized perpendicular to this direction will have minimum diffraction efficiency.

Figure 14:
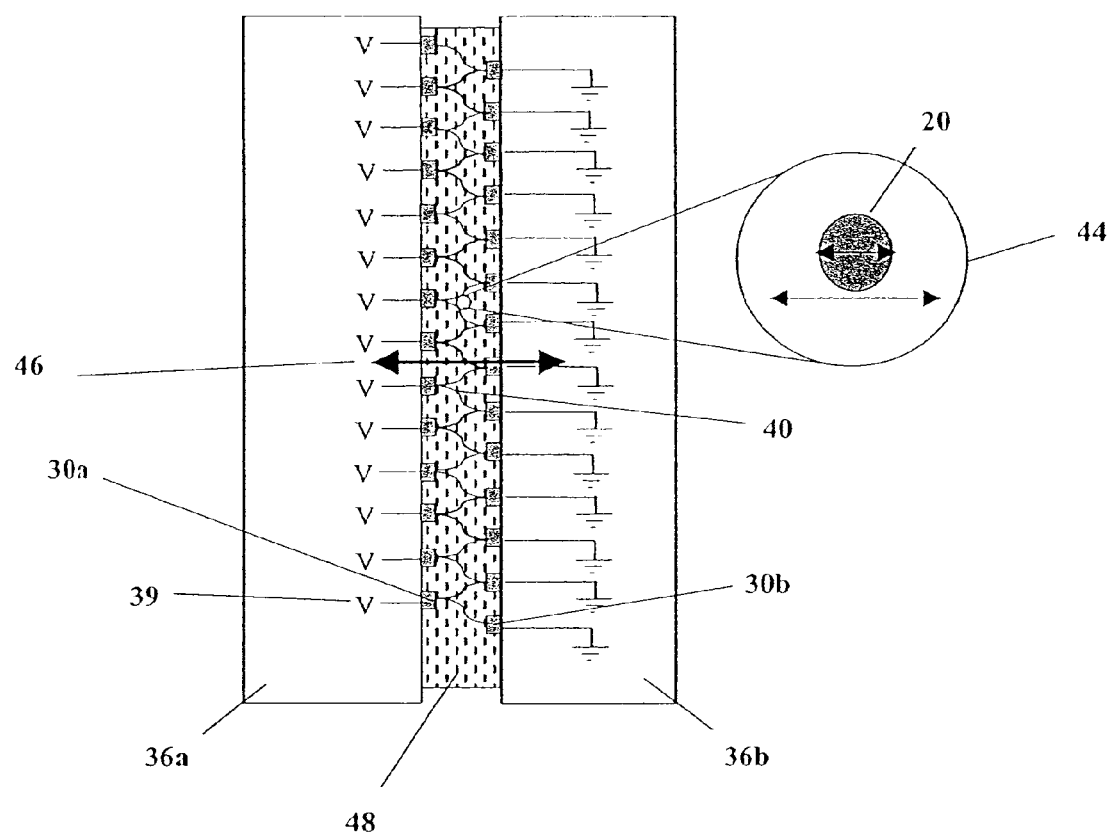
FIG. 14 shows a voltage scheme for aligning the LC droplets of a HPDLC optical element according to an embodiment of the present invention.

To switch a hologram "off" that is recorded in this manner (i.e., to zero out or minimize the index modulation), the approximate switching voltage (V) 39 is now applied to each finger electrode in the front set of electrodes 30a, with the back set of electrodes 30b being connected to ground. This produces the film-normal field pattern 46 illustrated in FIG. 14. The LC droplet symmetry axes of the switchable HPDLC material 48 are thus reoriented in this direction, which produces the minimum index modulation to incident light as illustrated in the figure. This electrode configuration can also be used to optimize temporal response as discussed further below.

In a second embodiment of the present invention, a system is described for controlling index modulation through fringe stability and/or contrast control. Achieving excellent fringe stability and contrast in the interferogram applied to the HPDLC material optimizes index modulation in holography. Fringe contrast is degraded by internal Fresnel reflections in the cell containing the HPDLC material. These reflections also lead to the formation of cross gratings as the main hologram is recorded, which contribute to haze and cosmetic defects and decrease index modulation. The primary source of these reflections is at the interface between the transparent electrode (i.e., indium tin oxide (ITO)) and the pre-polymer LC material. To alleviate this problem, a broad band anti-reflection (AR) coating is incorporated into the transparent electrodes. The term AR coating refers to a substantially transparent multilayer film that is applied to optical systems (e.g., surfaces thereof) to substantially eliminate reflection over a relatively wide portion of the visible spectrum, and thereby increase the transmission of light and reduce surface reflectance. Known anti-reflection coatings include multi-layer films comprising alternating high and low refractive index materials (e.g., metal oxides) as described, for instance, in U.S. Pat. Nos. 3,432,225, 3,565,509, 4,022,947, and 5,332,618 which are incorporated herein by reference in their entireties. In cases of the present invention where etching of the transparent electrode is not necessary, an AR coating is obtained by a thin film stack of alternating layers of magnesium fluoride and ITO applied to the glass on the side facing the pre-polymer LC material. For cases where etching of the ITO is desired, the preferred AR coating is a thin film stack of tantalum oxide/magnesium fluoride deposited on the glass with an ITO overcoat. In addition, during the recording process, an AR-coated piece of glass is optically connected to the outside faces of the holographic cell using index-matching fluid. These AR coatings are optimized for the wavelength used in recording the hologram. One skilled in the art recognizes the variations in AR coating that may be alternatively used in this embodiment of the present invention.

Figure 15:
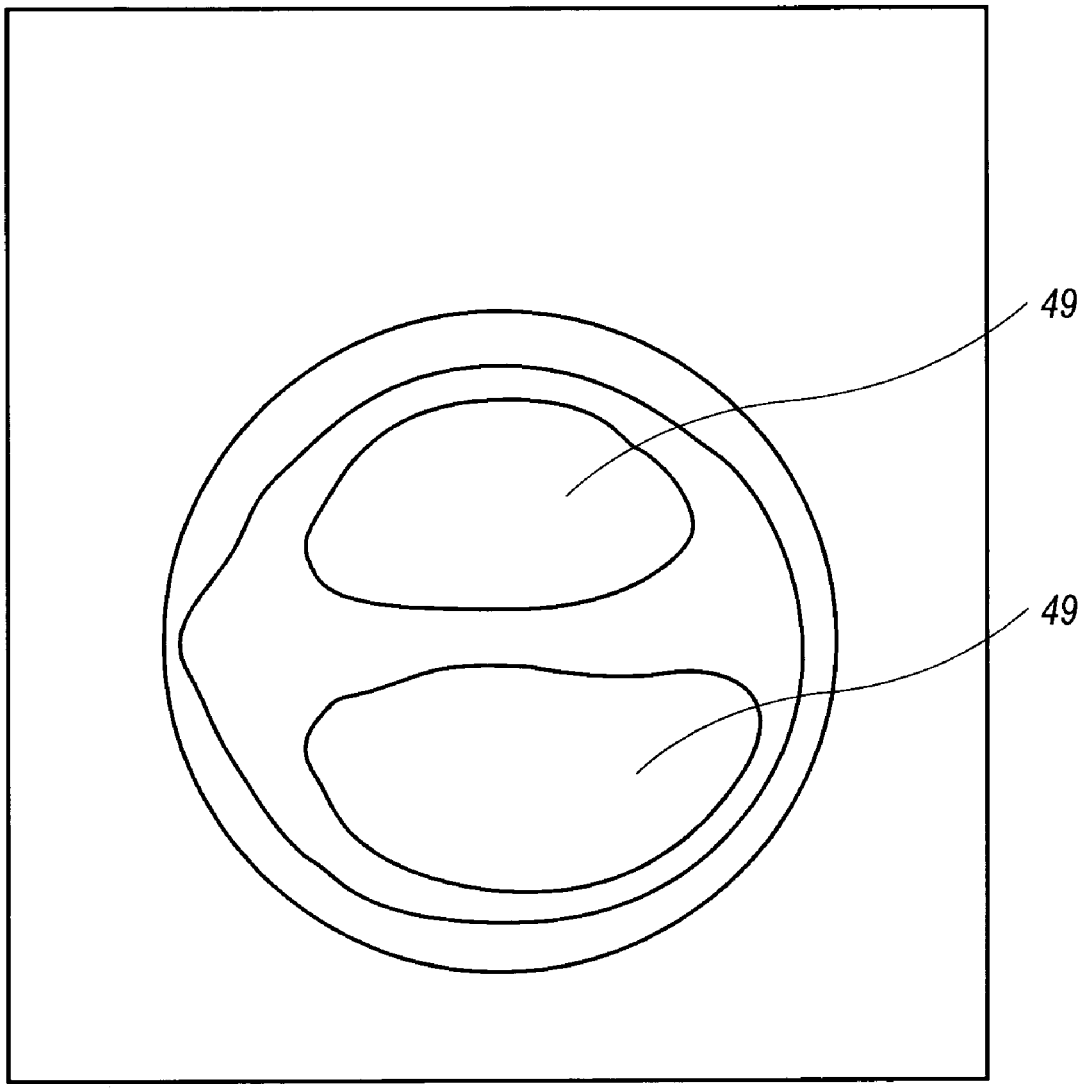
FIG. 15 shows a conventional transmission hologram prepared without pre-exposure.

In a third embodiment of the present invention, haze and cosmetic quality, and diffraction efficiency are controlled through pre-establishment of a loosely gelled network in the PDLC recording medium. As mentioned earlier, the rapid polymerization and elastic relaxation of the multi-functional acrylate system can lead to instability and non-uniformity in the optical quality of the hologram, as illustrated by the example in FIG. 15 for a transmission hologram. The two-lobed 49 "walnut-shaped" pattern observed in FIG. 15 is a result of the instability described above. This is related to the rapid formation of a gel network in this free-radical system and non-uniform shrinkage of the polymer set in place by the formation of the hologram. In reflection holograms, this non-uniform shrinkage leads to non-uniform chirp and tapering of the index modulation, producing a broadening of the diffraction notch, a reduction of the peak diffraction efficiency, and a washing out of the sidelobes. Consequently, in this third embodiment of the present invention, a pre-establishment of a loosely gelled network prior to hologram recording is accomplished in a variety of ways. This loosely gelled network is (a) not so stiff that it inhibits the diffusion of components and subsequent phase separation which are crucial to the formation of a switchable H-PDLC hologram, but (b) is sufficiently strong to stabilize the system and prevent shrinkage instabilities from setting in as the hologram begins to form. One way to accomplish this, for example, is by blocking one of the two beams utilized in the recording setup for a period of approximately 2-5 seconds so that the first exposure of the sample is a beam of uniform amplitude and phase that irradiates the sample uniformly, such that this radiation partially bleaches the photoinitiator dye uniformly throughout the sample. This partial bleaching can also be done by blocking both coherent beams and irradiating the sample with an incoherent beam of radiation. This partial bleaching of the photoinitiator establishes a loose gel network. After this process, both coherent beams are unblocked so that the sample is irradiated holographically in the usual manner. The hologram is then recorded in an identical manner as previously described in, for example, U.S. Pat. No. 5,942,157. The result is a switchable hologram of high diffraction efficiency and excellent optical as well as cosmetic quality, with uniform diffraction efficiency across the sample.

As an alternative to the photoinitiator partial bleaching technique above, wherein the photoinitiator matched to the recording wavelength is partially bleached, additional photoinitiators can be added to the pre-polymer material so that pre-establishment of the loosely gelled network can be accomplished using illumination by a wavelength that does not overlap with the absorption spectrum of the photoinitiator matched to the laser recording wavelength. Examples may include using ultraviolet ("UV") initiators to expose the PDLC recording medium for short periods of time with UV illumination, or using visible initiators that do not interfere with hologram recording. A specific example includes adding methylene blue to a sample to be recorded with 488-nm light from an argon-ion laser. This sample is exposed 632.8 nm light from a He—Ne (helium neon) laser prior to holographic recording without bleaching the initiator that is sensitive to the 488-nm radiation.

It is understood that the pre-establishment of a loosely gelled network is not limited by the radiation exposure methods described above. Any technique to gently and partially cure the sample so that a loose gel network is established is contemplated by this disclosure. These techniques are known to those in the art of polymer chemistry and may include heat, electron beams, or the presence of other reactants that can be triggered by some external mechanism. The third embodiment describes the formation of a loosely gelled network prior to hologram recording in order to stabilize the system against non-uniform shrinkage as the hologram forms during a subsequent photopolymer chemical reaction.

Another alternative method commensurate with the scope of the third embodiment comprises loading the pre-polymer PDLC recording medium into a pre-existing loose network, such as an aerogel. An aerogel is a glass or polymer network that consists mostly of air voids that are much larger than a typical grating period or LC droplet in an H-PDLC. The pre-polymer PDLC recording medium fills the voids by capillary action. Such a filled aerogel is then sandwiched between two ITO-coated glass plates and irradiated holographically in the manner described previously. The aerogel does not prevent diffusion of components or subsequent phase separation of LC droplets in the grating planes, but acts analogously to the loosely gelled polymer network of the previous examples to stabilize the system against non-uniform shrinkage.

Figure 16:
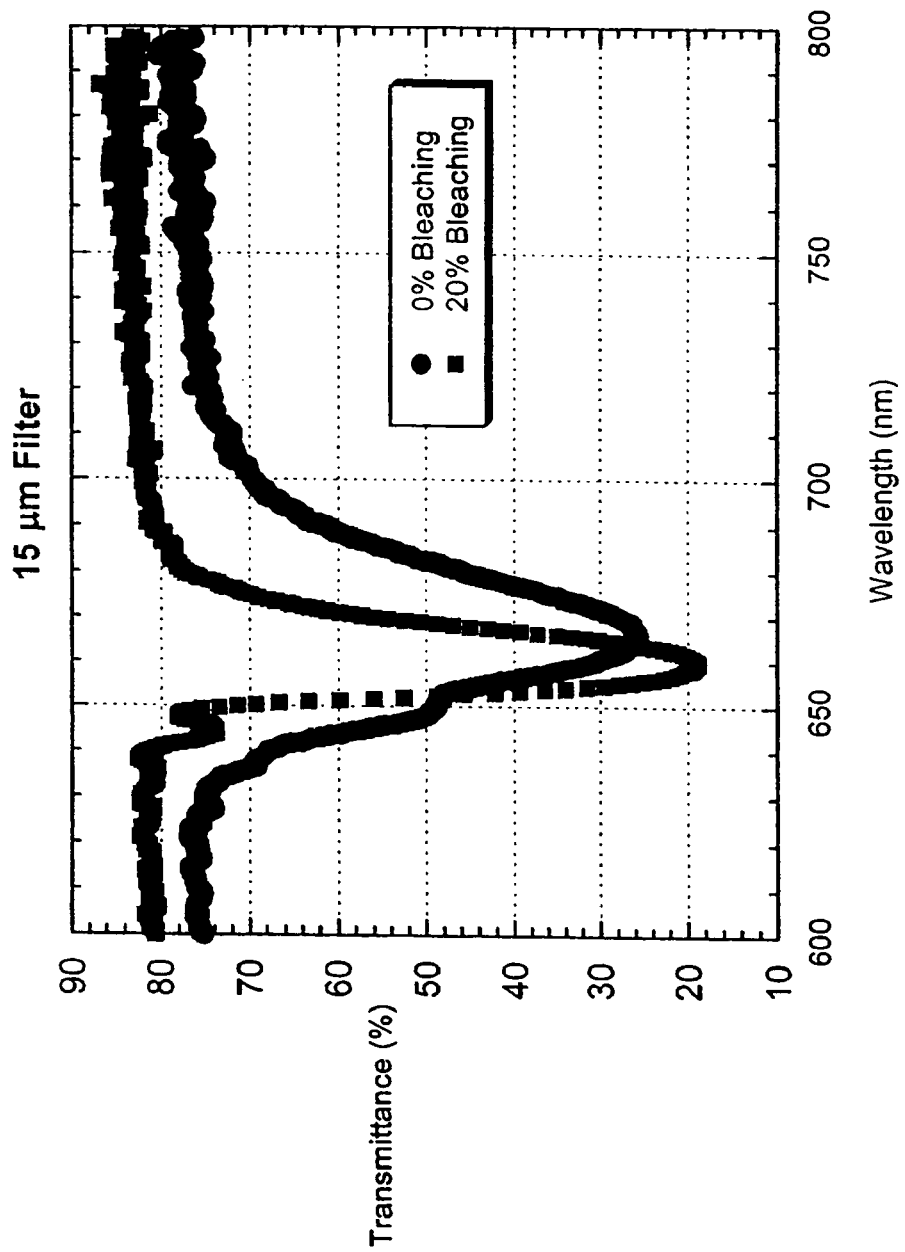
FIG. 16 shows a diffraction efficiency comparison according to an embodiment of the present invention.

This technique of pre-establishment of a loosely gelled network in the sample can be applied to transmission and reflection gratings alike. This technique decreases the haze, improving the optical quality of holograms. Further, this technique stabilizes the system to shrinkage normal to the plane of the film, which reduces chirping of the grating period and tapering of the index modulation profile. This enhances the diffraction efficiency of the hologram. An example of improvement of the diffraction efficiency in a reflection hologram using this technique by partial bleaching of the photoinitiator is given in FIG. 16.

In a fourth embodiment of the present invention, haze and cosmetic quality are controlled using index matching and scattering control. Significant cosmetic inhomogeneity and haze can be attributed to the presence of cross-gratings that appear as a result of reflections from the internal and external surfaces of the HPDLC optical device during recording of the hologram. These reflections interfere with both the incident beams and other reflections, thus recording unwanted holograms in the HPDLC film. In order to minimize these unwanted reflections, conductive index-matched transparent electrodes as described with reference to the third embodiment are utilized. This greatly reduces unwanted internal reflections. These anti-reflective electrodes reduce reflection from the internal surfaces. Second, a transparent tank recording setup is employed to greatly reduce reflections from the external surfaces.

Figure 17:
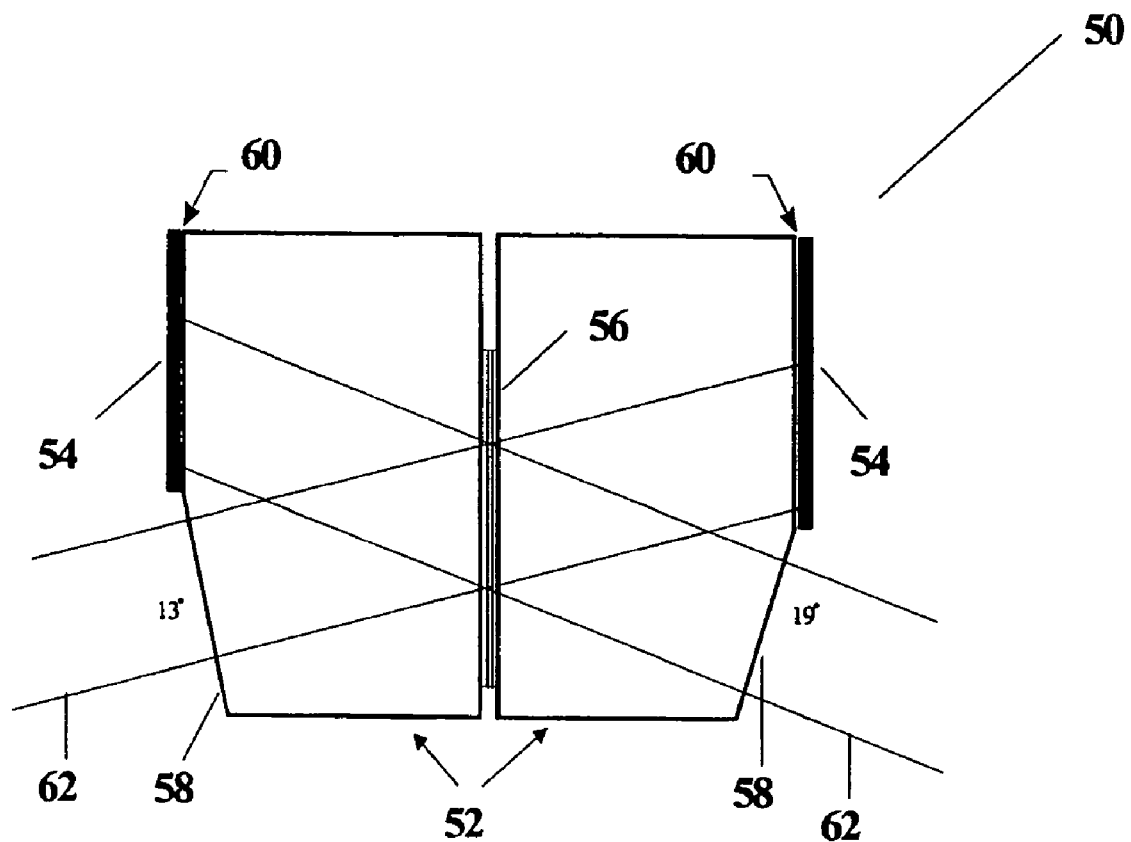
FIG. 17 shows a hologram recording set-up according to an embodiment of the present invention.

Unwanted reflections at the glass/air interfaces are rendered harmless by the transparent tank arrangement depicted in FIG. 17. It is widely known in the holographic industry that these reflections are troublesome, thus many organizations record holograms in tanks of index-matching fluid. While this approach can be effective, it is labor-intensive and requires extensive clean up. In addition, with PDLC materials, index-matching fluid can dissolve the LC, and therefore the cells must be completely sealed if such an approach is to be used. The transparent tank arrangement 50 depicted in FIG. 17 uses prisms 52 or glass blocks and neutral density (ND) filters 54 to stop unwanted reflections from exposing the holographic cell 56. In a specific embodiment, two custom BK-7 blocks 52 possessing the same refractive index as the HPDLC optical device 56 are manufactured to provide a particular holographic geometry known to those skilled in the art. A HPDLC optical device 56 is placed in optical contact between the two blocks, usually with a drop or two of index-matching fluid. If a switchable HPDLC hologram is to be recorded, anti-reflective transparent electrodes are used.

As with a bare cell, the reflection at either first glass/air interface 58 is reflected safely away. In FIG. 17 the first glass/air interfaces 58 are angled at 13° and 19°, respectively. The reflection most problematic is the second surface reflection which, in a bare cell, travels back through the film. ND filters 54 are placed in optical contact at the second glass/air interfaces, separated by index matching fluid 60, opposite the 13° and 19° angled faces, where the recording beams 62 exit. Here, the ND filters 54 safely absorb the recording laser beams 62 before a significant reflection occurs. One skilled on the art recognizes the various optical densities that are available for use as ND filters (e.g., 3 OD). With this arrangement, only a few drops of index matching fluid are needed, less if the ND filters are bonded to the block. Thus, this arrangement represents an improvement over the use of an entire tank of index-matching fluid, especially considering the vulnerability of the HPDLC optical device to these fluids. Utilizing the transparent tank arrangement 50, baseline transmission of HPDLC holograms can be increased by a significant percentage, e.g., as much as 10-15%. This means less haze, less backscatter, and a cosmetically improved HPDLC optical device. The negation of unwanted secondary gratings leads to an improved diffraction efficiency.

According to a fifth embodiment of the present invention, switching voltage can be controlled via tailoring of LC droplet size and shape. By way of background, switching is best discussed in the context of a simple model. According to U.S. Pat. No. 5,942,157, the switching voltage of a switchable hologram is related to the critical electric field ($E_c$) necessary to reorient the LCs. This critical field is given by the following equation:

$$E_c = \frac{1}{3a}\left(\frac{\sigma_{LC}}{\sigma_p} + 2\right)\left[\frac{\bar{k}(l^2 - 1)}{\Delta\varepsilon}\right]^{1/2} \quad (24)$$

Equation (24) predicts the critical field for an elongated LC droplet, with semi-major axis a, semi-minor axis b, and aspect ratio l=a/b. Further to equation (1), $\sigma_{LC}$ and $\sigma_p$ are the electrical conductivities of the LC and polymer, respectively; $\bar{k}$ is an average elastic force constant while $\Delta\varepsilon$ is the dielectric anisotropy, both considered constant properties of the bulk LC. This equation can be used to identify properties to target for reducing the switching voltage. The aspect ratio l can be controlled, but may be traded off against other parameters, e.g., polarization dependence or index modulation.

The same elongated droplet model leading to Equation (24) predicts a relaxation time, when the applied field is turned off, given by $$\tau_{off} = \frac{\gamma_1 a^2}{\bar{k}(l^2 - 1)} \quad (25)$$

where $\gamma_1$ is the rotational viscosity coefficient of the LC. Thus, a reduction in the effective elastic force constant that produces a reduction in the critical field by a factor of M will tend to increase the relaxation time by a factor of $M^2$. If the longer relaxation time is still compatible with the switching time needed for a particular application, then the slower relaxation is not a severe penalty. However, there may be cases where a longer relaxation time is not desired.

The limiting speed of the switchable hologram is given by the relaxation time $\tau_{off}$ given by Equation (25) above. Two important geometrical parameters are droplet size a and shape l. Droplet size a also impacts scattering loss; the scattering coefficient increases with size approximately as $a^3$. There is also a trade-off of switching voltage with relaxation time as seen in Equation (24). It is clearly desirable to keep a as small as possible. Since scattering and relaxation time are approximately proportional to $a^3$ and $a^2$, respectively, while switching voltage is proportional to $a^{-1}$, much is to be gained by minimizing a. Ultimately, though, this will begin to increase switching voltage unfavorably, even when optimizing matrix conductivity, interfacial anchoring, and effective dielectric anisotropy. At some point it is desirable to offset decreases in a with some other parameter.

One such off-set parameter is the droplet shape. Changes in size ($\Delta a/a$) can be approximately offset by corresponding changes in shape ($\Delta l/l$), as can be seen by reference to Equations (24) and (25). Distorting droplets while they are being formed during phase separation can control droplet shape. It is generally desirable to induce distortion (i.e., elongation) in a direction parallel to the holographic film plane. Techniques for achieving this using external magnetic fields and stress fields have been discussed in U.S. Pat. No. 5,942,157. The first embodiment of the present invention sets forth a technique for controlling LC droplet formation using interdigitated electrodes and in-plane electric fields. In this embodiment, a is minimized to reduce scatter and relaxation time. Alternatively, if it is necessary to then increase a to optimize switching voltage, then l can be increased simultaneously to prevent the relaxation time from increasing. This off-setting procedure allows for LC droplet formation that optimizes HPDLC optical device operation.

According to a sixth embodiment of the present invention, switching speed is controllable through electrode design and voltage drive scheme. The limiting speed of the switchable hologram is given by the relaxation time $\tau_{off}$ given by Equation (25) above. The response time (i.e., when voltage is applied) is field dependent, however. Under conditions of optimal switching where $(2+\sigma_{LC}/\sigma_p)/3 \sim 1$, the response time when the critical field is applied can be estimated from $$\tau_{on} \sim \frac{\gamma_1}{4\Delta\varepsilon E_c^2}. \quad (26)$$

However, for large fields E as compared to $E_c$ ($E \gg E_c$) the response time is approximately given by $$\tau_{on} \sim \frac{\gamma_1}{\Delta\varepsilon E^2}. \quad (27)$$

Therefore, by way of example, assuming $\gamma_1 = 0.27$ kg/m–s and $\Delta\varepsilon = 15.3\varepsilon_0$, a response time of 10 μs would require a field strength of ~15 V/μm. This analysis indicates that a fast response time would be achievable if the hologram could be driven both "on" and "off" with a large enough field. Pursuant to the sixth embodiment of the present invention, this can be achieved while maintaining low power consumption.

Figure 18A:
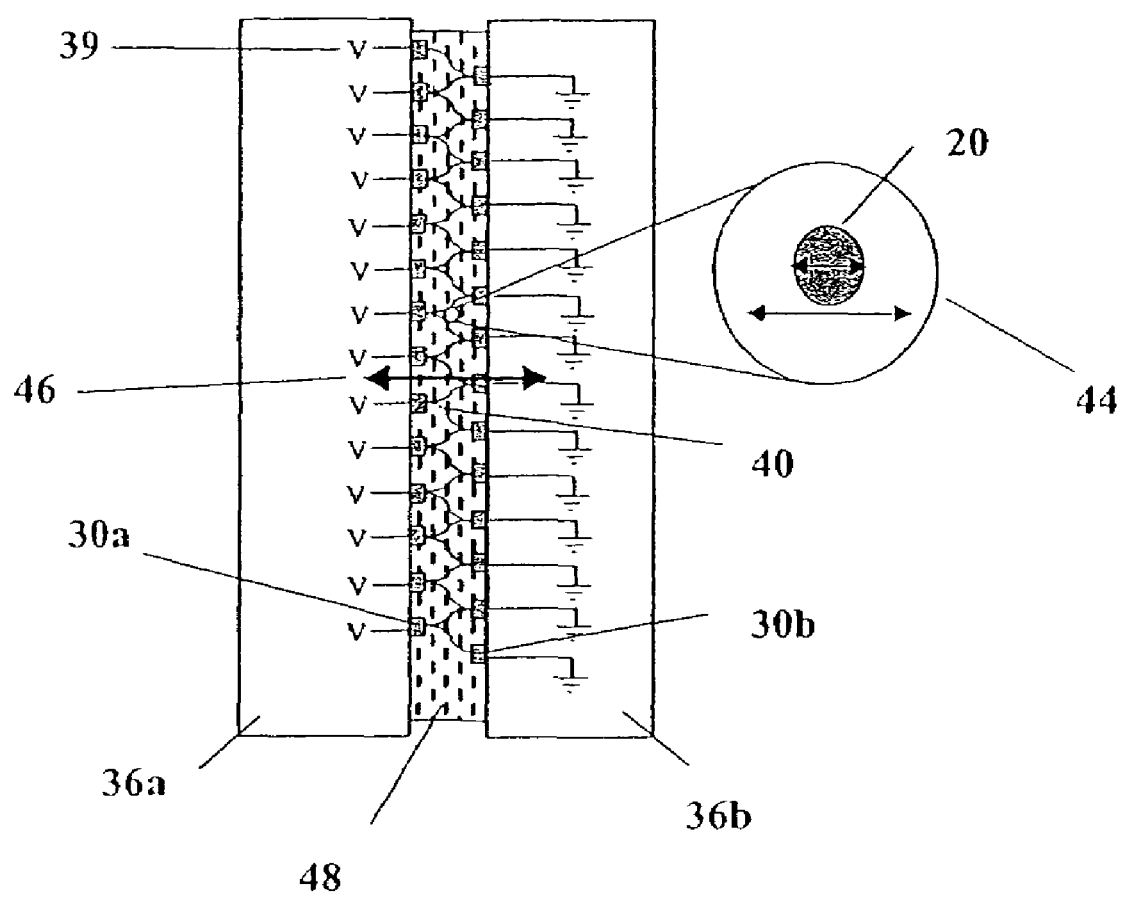
FIGS. 18a and 18b show voltage schemes for switching a HPDLC optical element according to an embodiment of the present invention.
Figure 18B:
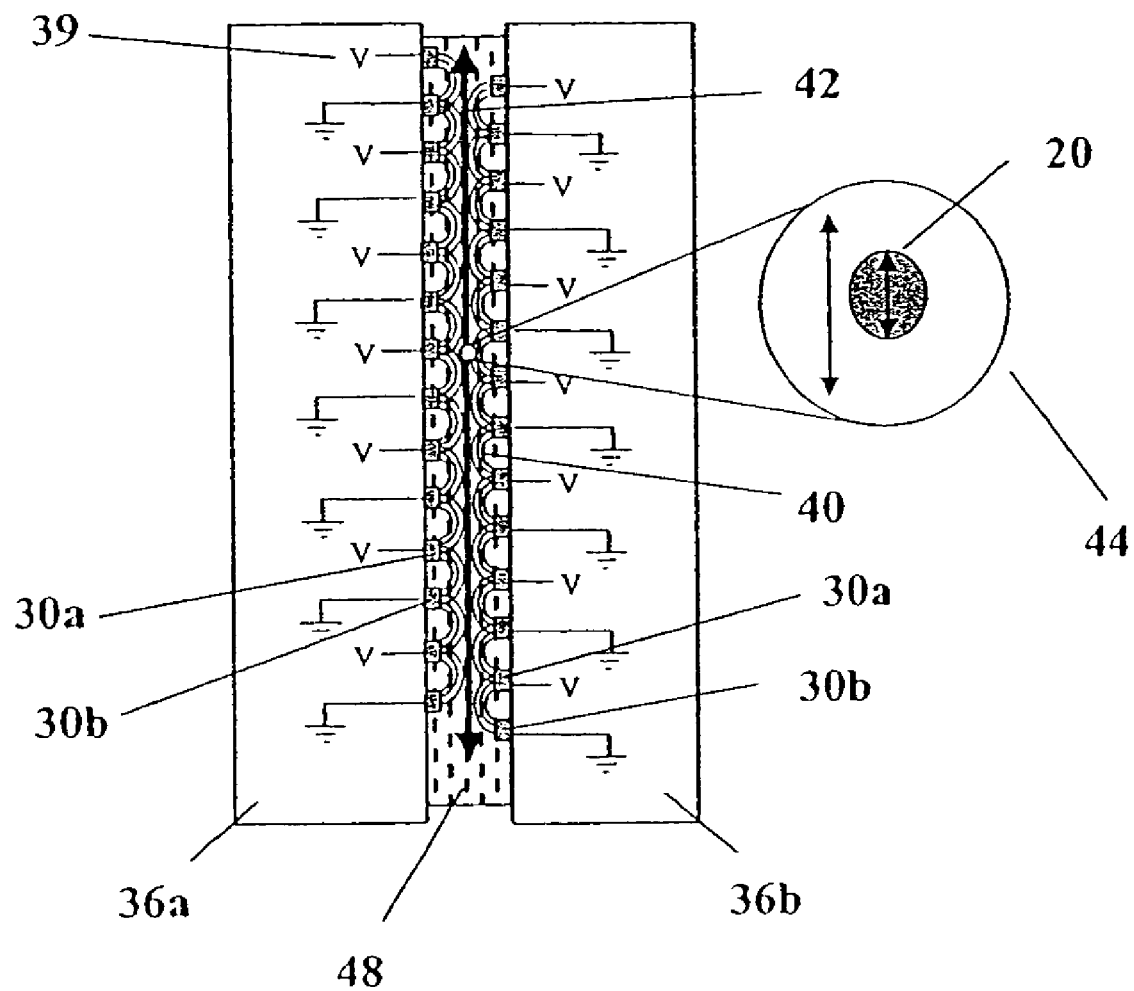

Referring to FIG. 18a, to drive the hologram "off," a field perpendicular to the film plane is applied. This is done by applying a voltage (V) 39 approximately equal to the switching voltage to each finger electrode 30a on the front plate 36a, and connecting the electrodes 30b on the back plate 36b to ground. This is similar to the effect that occurs when the front and back electrodes are planar rather than patterned, and the field that results is illustrated through field lines 40. To drive the hologram back "on," the previous voltage scheme is removed, and simultaneously a new voltage scheme is applied, as illustrated in FIG. 18b. Referring to FIG. 18b, the voltage (V) 39 on every other finger electrode 30a on both plates 36a, 36b is approximately equal to the switching voltage, with intermediate finger electrodes 30b on each plate 36a, 36b being connected to ground. This produces an in-plane electric field 42 and drives the hologram "on." Switching back and forth between these two schemes drives the hologram "on" and "off," with a response time in each case given approximately by Equation (27).

Figure 19:
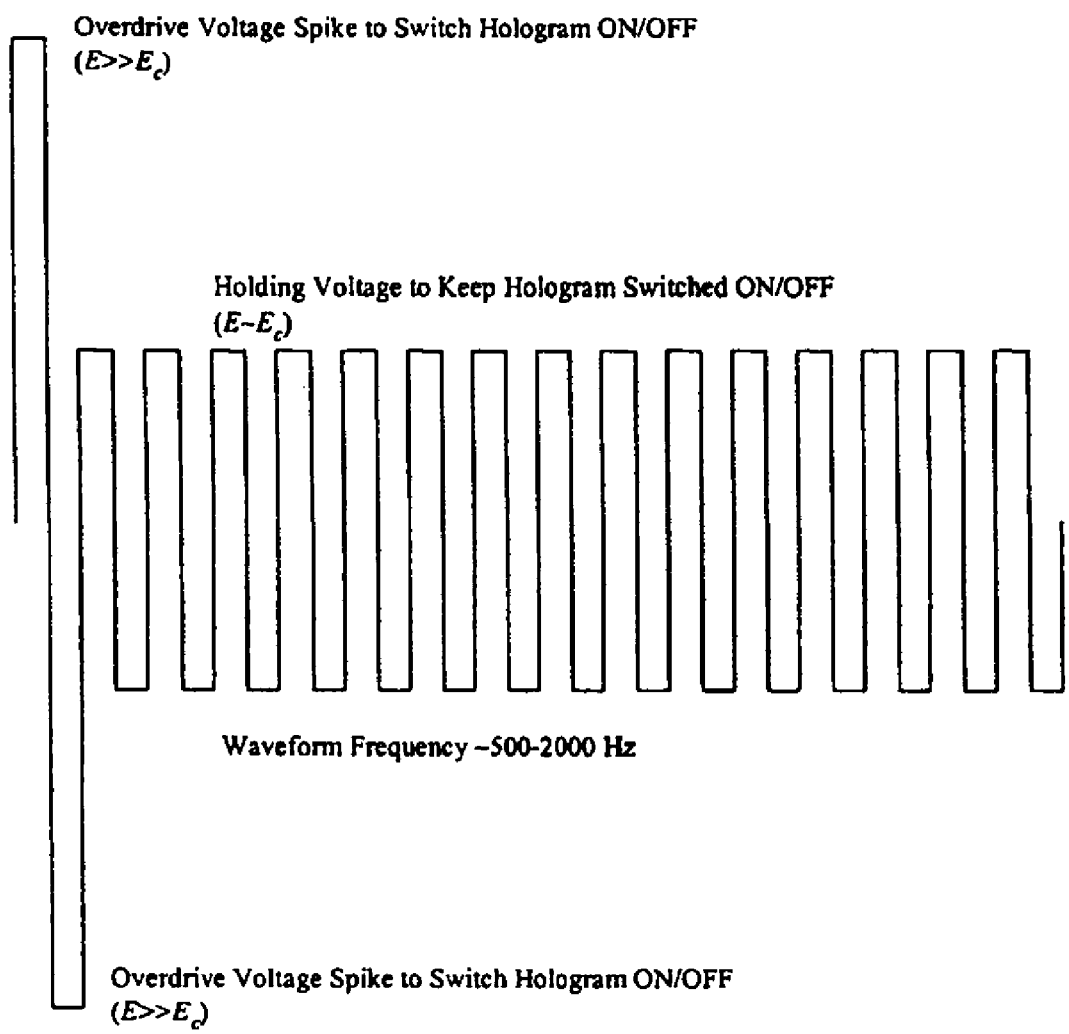
FIG. 19 shows a voltage drive waveform for switching a HPDLC optical element according to an embodiment of the present invention.

Switchable HPDLC holograms are normally driven at 500-2000 Hz. The period of this waveform (0.5-2 ms) is long compared to the desired response time of the device. Therefore, the hologram can be overdriven in the first cycle of the waveform by a field sufficient to produce a fast response time given by Equation (27), with the rest of the waveform settling to a lower value $\sim E_c$ to maintain the desired state of the hologram. This type of waveform is illustrated in FIG. 19. In this manner, the voltage is retained at a reasonably low value during most of the operation of the device, with little increase in the power consumption.

The embodiments described above are not intended to be limiting. One skilled in the art recognizes the obvious variations and trade-offs that are included within the scope of the embodiments set forth herein.

What is claimed is:

1. A method for forming a holographically polymerized polymer dispersed liquid crystal optical element with reduced haze comprising:
    adding a pre-polymerized polymer dispersed liquid crystal material to a pre-existing loosely gelled network;
    placing the pre-existing loosely gelled network containing the pre-polymerized polymer dispersed liquid crystal material between first and second transparent substrates; and
    interfering a first beam and a second beam within the pre-existing loosely gelled network containing the pre-polymerized polymer dispersed liquid crystal material to form the holographically polymerized polymer dispersed liquid crystal optical element with reduced haze.

2. The method according to claim 1, wherein the pre-existing loosely gelled network is an aerogel.

3. A method for forming a holographically polymerized polymer dispersed liquid crystal optical element with reduced haze comprising:
    forming a loosely gelled network within a pre-polymerized polymer dispersed liquid crystal material;
    placing the loosely gelled network containing the pre-polymerized polymer dispersed liquid crystal material between first and second transparent substrates; and
    directing a first beam and a second beam at the pre-existing loosely gelled network containing the pre-polymerized polymer dispersed liquid crystal material; and
    holographically polymerizing the polymer dispersed liquid crystal material, including the loosely gelled network, to form the polymer dispersed liquid crystal optical element with decreased haze.

4. The method of claim 3, wherein the loosely gelled network is an aerogel.

5. The method of claim 3, wherein the first and second transparent substrates are glass plates.

6. The method of claim 5, wherein the glass plates are coated with indium tin oxide.

7. The method of claim 3, wherein the substrates are conductive.

8. The method of claim 3, further comprising a transparent tank.

9. The method of claim 8, wherein the transparent tank further comprises at least one prism or glass block.

10. The method of claim 8, wherein the transparent tank further comprises at least one neutral density filter.

11. The method of claim 9, wherein the transparent tank comprises at least one BK-7 block.

12. The method of claim 9, wherein the at least one prism or glass block comprises substantially the same refractive index as the polymer dispersed liquid crystal optical element.

13. The method of claim 3, further comprising the step of blocking the first beam and allowing the second beam to interact with the pre-polymer liquid crystal material for a predetermined amount of time, wherein the interaction converts the pre-polymer liquid crystal material into the loosely gelled network.

14. The method of claim 13, wherein holographically polymerizing the polymer dispersed liquid crystal material comprises unlocking the first beam, such that both the first and second beams interact within the loosely gelled network to form the polymer dispersed liquid crystal optical element.

15. The method according to claim 13, wherein the predetermined amount of time is approximately 2 to 5 seconds.

16. The method according to claim 13, wherein the pre-polymer liquid crystal material contains a photoinitiator that is responsive to the wavelength of the second beam, but is not responsive to the wavelength of the first beam.

* * * * *